United States Patent
Berner et al.

(10) Patent No.: US 10,989,945 B2
(45) Date of Patent: Apr. 27, 2021

(54) ELECTRICAL CONNECTION CONFIGURATIONS FOR PRIVACY GLAZING STRUCTURES

(71) Applicant: Cardinal IG Company, Eden Prairie, MN (US)

(72) Inventors: Eric Berner, Ramsey, MN (US); Eric Bjergaard, Minneapolis, MN (US); Timothy Braun, Plymouth, MN (US); Andrew DeMiglio, Savage, MN (US); Chad Peters, Prior Lake, MN (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 16/921,686

(22) Filed: Jul. 6, 2020

(65) Prior Publication Data
US 2020/0333656 A1 Oct. 22, 2020

Related U.S. Application Data

(63) Continuation of application No. 16/035,267, filed on Jul. 13, 2018, now Pat. No. 10,705,363.
(Continued)

(51) Int. Cl.
*G02F 1/1343* (2006.01)
*G02F 1/1339* (2006.01)
(Continued)

(52) U.S. Cl.
CPC .. *G02F 1/133308* (2013.01); *B32B 17/10036* (2013.01); *B32B 17/10165* (2013.01);
(Continued)

(58) Field of Classification Search
CPC ............. G02F 1/1339; G02F 1/134309; G02F 1/13306; G02F 1/1333; G02F 1/1343;
(Continued)

(56) References Cited

U.S. PATENT DOCUMENTS 3,951,846 A 4/1976 Gavrilovic
3,953,630 A 4/1976 Roberts et al.
(Continued)

FOREIGN PATENT DOCUMENTS

CN 201226062 Y 4/2009
CN 101775953 A 7/2010
(Continued)

OTHER PUBLICATIONS

Bortolozzo et al., "Transmissive Liquid Crystal Light-valve for Near-Infrared Applications," Appl. Opt., 52(22):E73-E77, Aug. 2013.
(Continued)

*Primary Examiner* — Thoi V Duong
(74) *Attorney, Agent, or Firm* — Fredrikson & Byron, P.A.

(57) ABSTRACT

A privacy glazing structure may include an electrically controllable optically active material that provides controlled transition between a privacy or scattering state and a visible or transmittance state. To make electrical connections with electrode layers that control the optically active material, the privacy glazing structure may include electrode engagement regions. In some examples, the electrode engagement regions are formed as notches in peripheral edges of opposed panes bounding the optically active material. The notches may or may not overlap to provide a through conduit in the region of overlap for wiring. In either case, the notches may allow the remainder of the structure to have a flush edge surface for ease of downstream processing.

20 Claims, 14 Drawing Sheets

Related U.S. Application Data

(60) Provisional application No. 62/532,154, filed on Jul. 13, 2017.

(51) Int. Cl.

| | | |
|---|---|---|
| *G02F 1/1333* | (2006.01) | |
| *E06B 9/24* | (2006.01) | |
| *B32B 17/10* | (2006.01) | |
| *E06B 3/67* | (2006.01) | |
| *G02F 1/153* | (2006.01) | |
| *G02F 1/133* | (2006.01) | |
| *G02F 1/137* | (2006.01) | |

(52) U.S. Cl.
CPC .. *B32B 17/10293* (2013.01); *B32B 17/10302* (2013.01); *B32B 17/10467* (2013.01); *B32B 17/10504* (2013.01); *B32B 17/10513* (2013.01); *B32B 17/10532* (2013.01); *E06B 3/6722* (2013.01); *E06B 9/24* (2013.01); *G02F 1/1333* (2013.01); *G02F 1/1343* (2013.01); *G02F 1/134309* (2013.01); *G02F 1/153* (2013.01); *E06B 2009/2464* (2013.01); *G02F 1/1339* (2013.01); *G02F 1/13306* (2013.01); *G02F 2001/13775* (2013.01); *G02F 2001/133302* (2013.01); *G02F 2001/133322* (2013.01); *G02F 2001/133331* (2013.01); *G02F 2001/133354* (2013.01); *G02F 2001/133388* (2013.01)

(58) Field of Classification Search
CPC ........... G02F 1/13452; G02F 1/133308; G02F 1/1345; G02F 1/155; G02F 1/15; G02F 1/153; G02F 2001/133302; G02F 2001/133388; G02F 2001/133322; G02F 2001/133331; G02F 2001/133354; G02F 2001/13775; G02F 2201/12; B32B 17/10513; B32B 17/10504; B32B 17/10532; B32B 17/10036; B32B 17/10165; B32B 17/10293; B32B 17/10302; B32B 17/10467; E06B 2009/2464; E06B 3/6722; E06B 9/24
See application file for complete search history.

(56) References Cited

U.S. PATENT DOCUMENTS

| | | |
|---|---|---|
| 4,047,351 A | 9/1977 | Derner et al. |
| 4,150,877 A | 4/1979 | Kobale et al. |
| 4,277,294 A | 7/1981 | Orcutt |
| 4,284,677 A | 8/1981 | Herliczek |
| 4,465,340 A | 8/1984 | Suganuma |
| 4,587,784 A | 5/1986 | Chavy et al. |
| 4,614,676 A | 9/1986 | Rehfeld |
| 4,702,566 A | 10/1987 | Tukude |
| 4,749,261 A | 6/1988 | McLaughlin et al. |
| 4,932,608 A | 6/1990 | Heidish et al. |
| 4,958,917 A | 9/1990 | Hashimoto et al. |
| 5,076,673 A | 12/1991 | Lynam et al. |
| 5,103,336 A | 4/1992 | Sieloff |
| 5,111,329 A | 5/1992 | Gajewski et al. |
| 5,111,629 A | 5/1992 | Baughman et al. |
| 5,142,644 A | 8/1992 | Vansteenkiste et al. |
| 5,151,824 A | 9/1992 | O'Farrell |
| 5,154,953 A | 10/1992 | De Moncuit et al. |
| 5,164,853 A | 11/1992 | Shimazaki |
| 5,168,387 A | 12/1992 | Asakura et al. |
| 5,197,242 A | 3/1993 | Baughman et al. |
| 5,202,787 A | 4/1993 | Byker et al. |
| 5,239,406 A | 8/1993 | Lynam |
| 5,244,557 A | 9/1993 | Defendini et al. |
| 5,408,353 A | 4/1995 | Nichols et al. |
| 5,589,958 A | 12/1996 | Lieb |
| 5,643,644 A | 7/1997 | Demars |
| 5,668,663 A | 9/1997 | Varaprasad et al. |
| 5,766,755 A | 6/1998 | Chaussade et al. |
| 5,796,452 A | 8/1998 | Pierson |
| 5,855,638 A | 1/1999 | Demars |
| 5,889,608 A | 3/1999 | Buffat et al. |
| 6,001,487 A | 12/1999 | Ladang et al. |
| 6,055,088 A | 4/2000 | Fix et al. |
| 6,061,105 A | 5/2000 | Nakagawa |
| 6,064,509 A | 5/2000 | Tonar et al. |
| 6,143,209 A | 11/2000 | Lynam |
| 6,261,652 B1 | 7/2001 | Poix et al. |
| 6,280,041 B1 | 8/2001 | Unger et al. |
| 6,297,900 B1 | 10/2001 | Tulloch et al. |
| 6,317,248 B1 | 11/2001 | Agrawal et al. |
| 6,340,963 B1 | 1/2002 | Anno et al. |
| 6,366,391 B1 | 4/2002 | Hurtz |
| 6,373,618 B1 | 4/2002 | Agrawal et al. |
| 6,407,847 B1 | 6/2002 | Poll et al. |
| 6,466,298 B1 | 10/2002 | Fix et al. |
| 6,486,928 B1 | 11/2002 | Lin et al. |
| 6,567,708 B1 | 5/2003 | Bechtel et al. |
| 6,589,613 B1 | 7/2003 | Kunert |
| 6,594,067 B2 | 7/2003 | Poll et al. |
| 6,621,534 B2 | 9/2003 | Lin et al. |
| 6,639,708 B2 | 10/2003 | Elkadi et al. |
| 6,643,050 B2 | 11/2003 | Rukavina et al. |
| 6,671,008 B1 | 12/2003 | Li et al. |
| 6,671,080 B2 | 12/2003 | Poll et al. |
| 6,795,226 B2 | 9/2004 | Agrawal et al. |
| 6,819,467 B2 | 11/2004 | Lynam |
| 6,829,074 B2 | 12/2004 | Terada et al. |
| 6,829,511 B2 | 12/2004 | Bechtel et al. |
| 6,842,276 B2 | 1/2005 | Poll et al. |
| 6,950,221 B1 | 9/2005 | Terada et al. |
| 7,002,720 B2 | 2/2006 | Beteille et al. |
| 7,009,665 B2 | 3/2006 | Li et al. |
| 7,023,600 B2 | 4/2006 | Mallya et al. |
| 7,033,655 B2 | 4/2006 | Beteille et al. |
| 7,081,929 B2 | 7/2006 | Furuki et al. |
| 7,085,609 B2 | 8/2006 | Bechtel et al. |
| 7,173,750 B2 | 2/2007 | Rukavina |
| 7,230,748 B2 | 6/2007 | Giron et al. |
| 7,300,166 B2 | 11/2007 | Agrawal et al. |
| 7,423,664 B2 | 9/2008 | Ukawa |
| 7,502,156 B2 | 3/2009 | Tonar et al. |
| 7,505,188 B2 | 3/2009 | Niiyama et al. |
| 7,525,714 B2 | 4/2009 | Poll et al. |
| 7,542,809 B2 | 6/2009 | Bechtel et al. |
| 7,671,948 B2 | 3/2010 | Ninomiya |
| 7,719,751 B2 | 5/2010 | Egerton et al. |
| 7,738,155 B2 | 6/2010 | Agrawal et al. |
| 7,746,534 B2 | 6/2010 | Tonar et al. |
| 7,817,327 B2 | 10/2010 | Derda |
| 7,822,490 B2 | 10/2010 | Bechtel et al. |
| 7,872,791 B2 | 1/2011 | Karmhag et al. |
| 7,876,400 B2 | 1/2011 | Baliga et al. |
| 7,906,203 B2 | 3/2011 | Hartig |
| 7,960,854 B2 | 6/2011 | Paulus et al. |
| 7,990,603 B2 | 8/2011 | Ash et al. |
| 8,102,478 B2 | 1/2012 | Xue |
| 8,164,818 B2 | 4/2012 | Collins et al. |
| 8,169,587 B2 | 5/2012 | Bolton |
| 8,187,682 B2 | 5/2012 | Albrecht et al. |
| 8,189,254 B2 | 5/2012 | Voss et al. |
| 8,199,264 B2 | 6/2012 | Veerasamy |
| 8,213,074 B1 | 7/2012 | Shrivastava et al. |
| 8,218,224 B2 | 7/2012 | Kwak et al. |
| 8,219,217 B2 | 7/2012 | Bechtel et al. |
| 8,263,228 B2 | 9/2012 | Torr |
| 8,289,609 B2 | 10/2012 | Lamine et al. |
| 8,343,571 B2 | 1/2013 | Werners et al. |
| 8,355,112 B2 | 1/2013 | Bolton |
| 8,482,838 B2 | 7/2013 | Sbar et al. |
| 8,547,624 B2 | 10/2013 | Ash et al. |
| 8,551,603 B2 | 10/2013 | Thompson |
| 8,610,992 B2 | 12/2013 | Varaprasad et al. |
| 8,619,204 B2 | 12/2013 | Salton et al. |

(56) References Cited

U.S. PATENT DOCUMENTS

| | | |
|---|---|---|
| 8,643,933 B2 | 2/2014 | Brown |
| 8,711,465 B2 | 4/2014 | Bhatnagar et al. |
| 8,810,889 B2 | 8/2014 | Brown |
| 8,869,493 B2 | 10/2014 | Chubb et al. |
| 8,913,215 B2 | 12/2014 | Yang et al. |
| 8,941,788 B2 | 1/2015 | Brecht et al. |
| 8,970,810 B2 | 3/2015 | Bowser et al. |
| 8,995,039 B2 | 3/2015 | Bartug et al. |
| 9,019,588 B2 | 4/2015 | Brown et al. |
| 9,036,242 B2 | 5/2015 | Bergh et al. |
| 9,091,868 B2 | 7/2015 | Bergh et al. |
| 9,097,842 B2 | 8/2015 | Van Nutt et al. |
| 9,102,124 B2 | 8/2015 | Collins et al. |
| 9,128,346 B2 | 9/2015 | Shrivastava et al. |
| 9,158,173 B2 | 10/2015 | Bhatnagar et al. |
| 9,176,357 B2 | 11/2015 | Lam et al. |
| 9,193,135 B2 | 11/2015 | Boote et al. |
| 9,316,883 B2 | 4/2016 | Sbar et al. |
| 9,333,728 B2 | 5/2016 | Veerasamy |
| 9,341,015 B2 | 5/2016 | Fernando et al. |
| 9,341,909 B2 | 5/2016 | Egerton et al. |
| 9,389,454 B2 | 7/2016 | Yamaguchi et al. |
| 9,400,411 B2 | 7/2016 | Poix et al. |
| 9,436,054 B2 | 9/2016 | Brown et al. |
| 9,436,055 B2 | 9/2016 | Shrivastava et al. |
| 9,442,341 B2 | 9/2016 | Shrivastava et al. |
| 9,477,130 B2 | 10/2016 | Dubrenat et al. |
| 9,494,717 B2 | 11/2016 | Reymond et al. |
| 9,550,457 B2 | 1/2017 | Green et al. |
| 9,568,799 B2 | 2/2017 | Lam et al. |
| 9,581,877 B2 | 2/2017 | Bass et al. |
| 9,606,411 B2 | 3/2017 | Bergh et al. |
| 9,606,412 B2 | 3/2017 | Geerlings et al. |
| 9,618,819 B2 | 4/2017 | Egerton et al. |
| 9,618,820 B2 | 4/2017 | Conklin et al. |
| 9,625,783 B2 | 4/2017 | Bjornard et al. |
| 9,664,976 B2 | 5/2017 | Rozbicki |
| 9,690,162 B2 | 6/2017 | Wilbur et al. |
| 9,726,925 B2 | 8/2017 | Relot et al. |
| 9,766,496 B2 | 9/2017 | Cammenga et al. |
| 9,810,963 B2 | 11/2017 | Gauthier et al. |
| 9,829,763 B2 | 11/2017 | Friedman et al. |
| 9,857,657 B2 | 1/2018 | Ash et al. |
| 9,891,454 B2 | 2/2018 | Zhang et al. |
| 9,927,609 B2 | 3/2018 | Cammenga et al. |
| 9,939,702 B2 | 4/2018 | Bjornard |
| 9,952,481 B2 | 4/2018 | Rozbicki et al. |
| 9,958,750 B2 | 5/2018 | Parker et al. |
| 9,958,751 B2 | 5/2018 | Bergh et al. |
| 9,963,383 B2 | 5/2018 | Veerasamy |
| 9,971,194 B2 | 5/2018 | Brecht et al. |
| 9,989,822 B2 | 6/2018 | Galstian |
| 2003/0227663 A1* | 12/2003 | Agrawal ............... G02F 1/155 359/265 |
| 2004/0233379 A1 | 11/2004 | Kinoshita et al. |
| 2005/0002081 A1 | 1/2005 | Beteille et al. |
| 2005/0132558 A1 | 6/2005 | Hennessy et al. |
| 2005/0233125 A1 | 10/2005 | Anderson et al. |
| 2008/0089073 A1 | 4/2008 | Hikmet |
| 2008/0317977 A1 | 12/2008 | Wu |
| 2009/0246426 A1 | 10/2009 | Wu |
| 2009/0279004 A1 | 11/2009 | Greenall et al. |
| 2009/0303565 A1 | 12/2009 | Karmhag et al. |
| 2010/0028585 A1 | 2/2010 | Shimatani |
| 2010/0279125 A1 | 11/2010 | Buyuktanir et al. |
| 2011/0007253 A1 | 1/2011 | Stocq |
| 2011/0181820 A1 | 7/2011 | Watanabe |
| 2012/0086904 A1 | 4/2012 | Oki et al. |
| 2012/0094118 A1 | 4/2012 | Oki et al. |
| 2012/0327499 A1 | 12/2012 | Parker et al. |
| 2013/0107563 A1 | 5/2013 | McCabe et al. |
| 2013/0265511 A1 | 10/2013 | Poix et al. |
| 2014/0020851 A1 | 1/2014 | Ouzts et al. |
| 2014/0041933 A1 | 2/2014 | Snyker et al. |
| 2014/0204294 A1 | 7/2014 | Lv |
| 2014/0211129 A1 | 7/2014 | Bowser et al. |
| 2014/0247475 A1 | 9/2014 | Parker et al. |
| 2015/0049270 A1 | 2/2015 | Zhang et al. |
| 2015/0049378 A1 | 2/2015 | Shrivastava et al. |
| 2015/0103389 A1 | 4/2015 | Klawuhn et al. |
| 2015/0116649 A1 | 4/2015 | Watanabe |
| 2015/0118869 A1 | 4/2015 | Brown et al. |
| 2015/0151613 A1 | 6/2015 | Weng |
| 2015/0219975 A1 | 8/2015 | Phillips et al. |
| 2015/0277165 A1 | 10/2015 | Burrows et al. |
| 2015/0346575 A1 | 12/2015 | Bhatnagar et al. |
| 2015/0370140 A1 | 12/2015 | Bertolini |
| 2015/0378189 A1 | 12/2015 | Kim et al. |
| 2016/0026061 A1 | 1/2016 | O'Keeffe |
| 2016/0085129 A1 | 3/2016 | Cammenga et al. |
| 2016/0085131 A1 | 3/2016 | Lam et al. |
| 2016/0096344 A1 | 4/2016 | Kurihara |
| 2016/0124284 A1 | 5/2016 | O'Keeffe |
| 2016/0138328 A1 | 5/2016 | Behmke et al. |
| 2016/0161818 A1 | 6/2016 | Gregard et al. |
| 2016/0187753 A1 | 6/2016 | Sbar et al. |
| 2016/0243773 A1 | 8/2016 | Wang |
| 2016/0312523 A1 | 10/2016 | Miyasaka et al. |
| 2016/0363831 A1 | 12/2016 | Ash et al. |
| 2016/0377951 A1 | 12/2016 | Harris |
| 2017/0028686 A1 | 2/2017 | Wilson et al. |
| 2017/0122028 A1 | 5/2017 | Suzuka et al. |
| 2017/0139302 A1 | 5/2017 | Tonar |
| 2017/0152702 A1 | 6/2017 | Chang et al. |
| 2017/0218686 A1 | 8/2017 | Galstian |
| 2017/0219908 A1 | 8/2017 | Brown et al. |
| 2017/0328121 A1 | 11/2017 | Purdy et al. |
| 2017/0371218 A1 | 12/2017 | Kailasam et al. |
| 2018/0011383 A1 | 1/2018 | Higashihara et al. |
| 2018/0095337 A1 | 4/2018 | Rozbicki et al. |
| 2018/0101080 A1 | 4/2018 | Gauthier et al. |
| 2018/0252975 A1 | 9/2018 | Endoh |
| 2018/0307111 A1 | 10/2018 | Le Houx et al. |
| 2019/0137796 A1 | 5/2019 | Bjergaard et al. |
| 2019/0137797 A1 | 5/2019 | Bjergaard et al. |

FOREIGN PATENT DOCUMENTS

| | | |
|---|---|---|
| CN | 203858432 U | 10/2014 |
| CN | 105044965 A | 11/2015 |
| CN | 105334656 A | 2/2016 |
| CN | 205176432 U | 4/2016 |
| CN | 104948080 B | 6/2016 |
| CN | 205297172 U | 6/2016 |
| CN | 205558664 U | 9/2016 |
| CN | 206035269 U | 3/2017 |
| CN | 206352460 U | 7/2017 |
| CN | 107288492 A | 10/2017 |
| CN | 107327250 A | 11/2017 |
| CN | 206737720 U | 12/2017 |
| CN | 206801372 U | 12/2017 |
| CN | 206848627 U | 1/2018 |
| CN | 207004397 U | 2/2018 |
| DE | 4121385 A1 | 1/1993 |
| EP | 978620 A2 | 2/2000 |
| EP | 2093051 A1 | 8/2009 |
| EP | 2256545 A1 | 12/2010 |
| EP | 2860580 A1 | 4/2015 |
| GB | 2546987 A | 8/2017 |
| JP | 62071930 | 4/1987 |
| JP | H01202713 A | 8/1989 |
| JP | 2004182484 A | 7/2004 |
| JP | 2017068196 A | 4/2017 |
| KR | 20130037600 A | 4/2013 |
| WO | 2005084378 A2 | 9/2005 |
| WO | 2008090438 A2 | 7/2008 |
| WO | 2010100807 A1 | 9/2010 |
| WO | 2012111715 A1 | 8/2012 |
| WO | 2014032023 A1 | 2/2014 |
| WO | 2015059029 A1 | 4/2015 |
| WO | 2015100419 A1 | 7/2015 |
| WO | 2015117736 A1 | 8/2015 |
| WO | 2016008375 A1 | 1/2016 |
| WO | 2016043164 A1 | 3/2016 |

(56) References Cited

FOREIGN PATENT DOCUMENTS

| WO | 2017008881 A1 | 1/2017 |
| WO | 2017011268 A1 | 1/2017 |
| WO | 2017183692 A1 | 10/2017 |
| WO | 2018086400 A1 | 5/2018 |

OTHER PUBLICATIONS

Invitation to Pay Additional Fees and Partial Search Report of the ISA/EP in PCT/US2018/042120, dated Oct. 19, 2018, 16 pgs.
International Search Report and Written Opinion of the ISA/EP in PCT/US2018/042120, dated Dec. 10, 2018, 21 pgs.

* cited by examiner

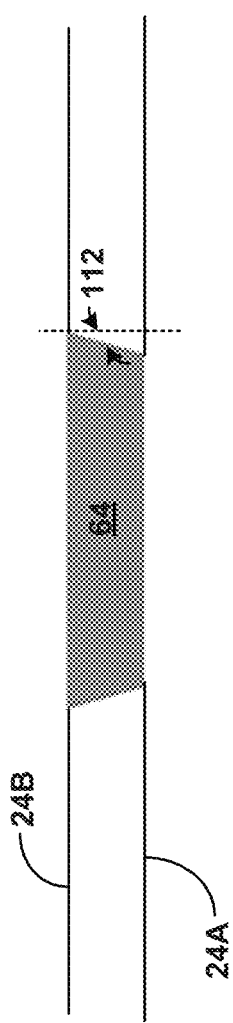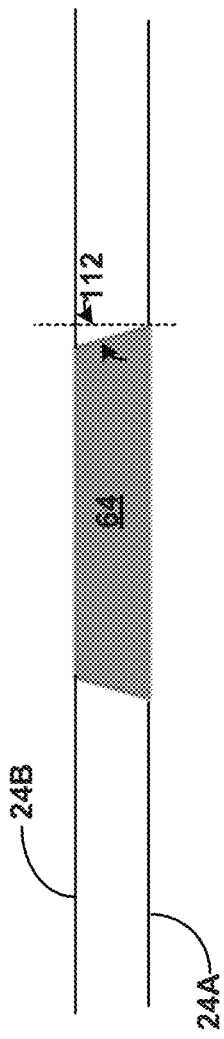

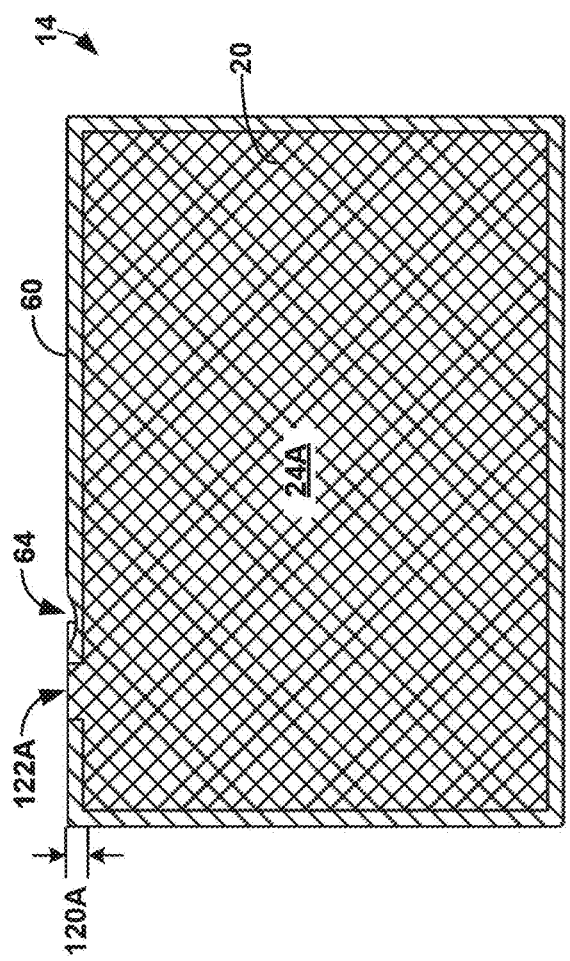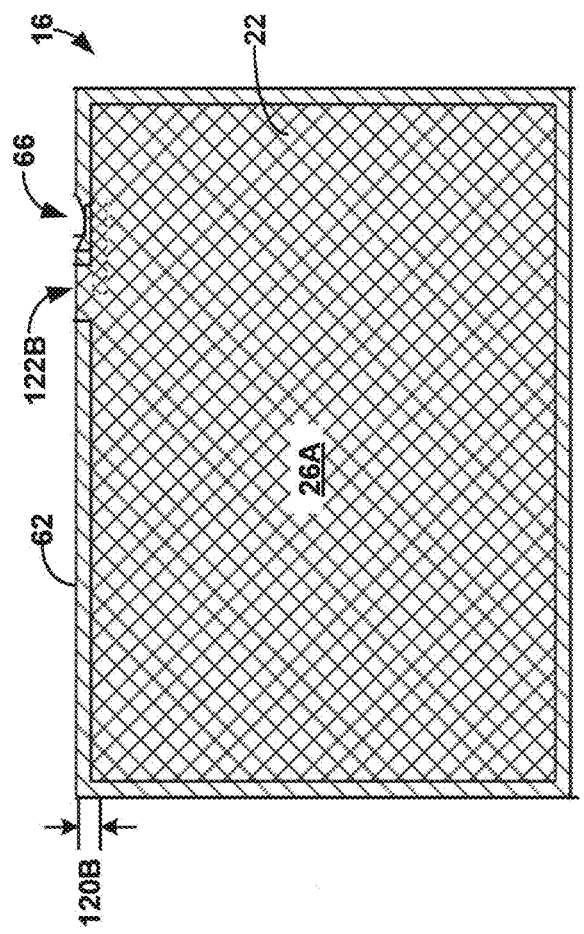

ELECTRICAL CONNECTION CONFIGURATIONS FOR PRIVACY GLAZING STRUCTURES

This application is a continuation of U.S. patent application Ser. No. 16/035,267, filed Jul. 13, 2018, which claims the benefit of U.S. Provisional Patent Application No. 62/532,154, filed Jul. 13, 2017, the entire contents of each of these applications are incorporated herein by reference.

TECHNICAL FIELD

This disclosure relates to structures that include an electrically controllable optically active material and, more particularly, to electrical connection configurations for glazing structures that include an electrically controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

In instances where controlled transmission is provided through application or removal of electrical energy, the optical transmission structure can include electrode contacts where electrical wiring interfaces with electrodes that control the optically controllable medium. To provide space on the structure needed to implement the electrode contacts, one substrate bounding the optically controllable medium may be offset from an opposite substrate, providing an offset lip where a bus bar can be installed. While effective to establish electrical contact, this offset structure can project into the sight line of the structure and be difficult to manipulate during further processing because of the irregular, offset surface.

SUMMARY

In general, this disclosure is directed to privacy structures incorporating an electrically controllable optically active material that provides controllable privacy. The term privacy structure includes privacy cells, privacy glazing structures, smart cells, smart glazing structure, and related devices that provide controllable optical activity and, hence, visibility through the structure. Such structures can provide switchable optical activity that provides controllable darkening, controllable light scattering, or both controllable darkening and controllable light scattering. Controllable darkening refers to the ability of the optically active material to transition between a high visible light transmission state (a bright state), a low visible light transmission dark state, and optionally intermediate states therebetween, and vice versa, by controlling an external energy source applied to the optically active material. Controllable light scattering refers to the ability of the optically active material to transition between a low visible haze state, a high visible haze state, and optionally intermediate states therebetween, and vice versa, by controlling an external energy source. Thus, reference to the terms "privacy" and "privacy state" in the present disclosure does not necessarily require complete visible obscuring through the structure (unless otherwise noted). Rather, different degrees of privacy or obscuring through the structure may be achieved depending, e.g., on the type of optically active material used and the conditions of the external energy source applied to the optically active material.

A privacy structure according to the disclosure can be implemented in the form of a window, door, skylight, interior partition, or yet other structure where controllable visible transmittance is desired. In any case, the privacy structure may be fabricated from multiple panes of transparent material that include an electrically controllable medium between the panes. Each pane of transparent material can carry an electrode layer, which may be implemented as a layer of electrically conductive and optically transparent material deposited over the pane. The optically active material may be controlled, for example via an electrical driver communicatively coupled to the electrode layers, by controlling the application and/or removal of electrical energy to the optically active material. For example, application and/or removal of electrical energy from the optically active material can cause the optically active material to transition from a scattering state in which visibility through the structure is inhibited to a transparent state in which visibility through the structure is comparatively clear.

To provide electrical contact between the electrode layers carried by the panes of transparent material, each pane may include a notch formed from a peripheral edge surface inward toward a center of the pane. The notch may be a groove or cut into the peripheral edge of the pane that defines a carve-out devoid of material. The notch can provide access to an underlying electrode layer. For example, the notch formed on a pane bounding one side of the optically active material can provide access to the electrode layer on the opposite pane and vice versa. Electrical wiring that supplies electrical energy to control the optically active material can be connected to each electrode layer through a corresponding notch.

While each pane may include a notch for making connection with an underlying electrode layer, the panes bounding the optically active material may themselves be joined together to provide a flush edge surface. For example, the panes bounding the optically active material, once joined together, may form a common edge surface with the peripheral edges of joined sheets being substantially co-planar. As a result, the panes bounding the optically active material may form a common, substantially planar edge that is generally orthogonal to the outer faces of the panes, e.g., without having the peripheral edge of one pane offset relative to the peripheral edge of another pane.

Configuring an optical structure with electrical connection regions that are recessed relative to a flush edge surface may be useful for a variety of reasons. First, configuring the optical structure with a flush edge can be useful to facilitate transport of the structure (e.g., on a conveyor line and/or conveyor rolls) for downstream processing that is challenging if one pane is offset relative to another pane. Second, in applications where a frame or sash (e.g., window or door frame or sash) is positioned around the optical structure, the flush edge surface can minimize or eliminate the extent to which the electrode connection region of the optical structure projects out of the frame or sash and into the slight line through which an external observer looks through the structure. Additionally, configuring an optical structure with electrical connection regions that are recessed relative to a flush edge may facilitate improved sealing around the optical structure, helping to prevent ingress of environmental contaminants into the structure.

The notches formed into the panes of transparent material to provide the electrical connection locations for the electrode layers can have a variety of different configurations. In some examples, the notches on opposed transparent panes arranged to partially but not fully overlap through the cross-section of the optical structure. As a result, a conduit may be formed through the entire thickness of the optical structure where the notches overlap. This conduit can provide an opening through which electrical wiring can be positioned to connect different electrode layers to an electrical source. For examples, rather than running wires to each electrode layer along both sides of the optical structure, the wiring may be run along a single side of the structure. Multiple wires can enter the conduit through one side of the conduit, with one wire bending approximately 90 degrees to connect to a first electrode layer and a another wire bending approximately 180 degrees to connect to a second electrode layer. Other configurations of notch and wiring arrangements are possible, and it should be appreciated that the disclosure is not limited in this respect.

To bond and/or seal opposed panes of transparent material bounding the optically active material together, a seal material may be positioned around the perimeter of the panes, e.g., surrounding the optically active material. Without wishing to be bound by any particular theory, it is has been found in some applications that positioning the seal over the electrode layers of the optical structure such that electricity is conveyed through the seal during operation of the structure has a tendency to accelerate degradation of the seal. Accordingly, in some configurations, the electrode layers on the optical structure are offset from the peripheral edge of the transparent panes about which the seal extends. For example, the electrode layers may be removed (e.g. via grinding or laser ablation) such that the perimeter region over which the seal extends is devoid of one or both electrode layers and/or the electrode layers are otherwise deactivated in the region. To provide electrical connection, however, one or both electrode layers may have a contact portion that extends into the otherwise deactivated perimeter region, e.g., to the perimeter edge. The contact portion may be positioned to underlie a notch of an overlying transparent pane, thereby providing an electrically active location for electrically connecting the electrode layer with a power source.

In one example, a privacy glazing structure is described that includes a first pane of transparent material, a second pane of transparent material, a first electrode layer, and a second electrode layer. The first pane of transparent material has an inner face, an outer face, and a peripheral edge. The second pane of transparent material has an inner face, an outer face, and a peripheral edge. The first electrode layer is on the inner face of the first pane of transparent material. The second electrode layer is on the inner face of the second pane of transparent material. The structure further includes an electrically controllable optically active material positioned between the first electrode layer on the inner face of the first pane of transparent material and the second electrode layer on the inner face of the second pane of transparent material. The example specifies that the first pane of transparent material is generally parallel to the second pane of transparent material to form a cavity therebetween containing the electrically controllable optically active material and the peripheral edge of the first pane of transparent material is aligned with the peripheral edge of the second pane of transparent material to provide a flush edge surface. The example further specifies that the first pane of transparent material defines a first notch providing access to the second electrode layer on the inner face of the second pane of transparent material and the second pane of transparent material defines a second notch providing access to the first electrode layer on the inner face of the first pane of transparent material.

The details of one or more examples are set forth in the accompanying drawings and the description below. Other features, objects, and advantages will be apparent from the description and drawings, and from the claims.

BRIEF DESCRIPTION OF DRAWINGS

FIGS. 8A and 8B illustrate example sloped notch wall surfaces that may be used on a notch according to the disclosure.

FIGS. 9A and 9B are views of example inner surfaces of first and second panes showing example electrode layer arrangements that can be used in a privacy structure according to the disclosure.

DETAILED DESCRIPTION

In general, the present disclosure is directed to electrical connection configurations for optical structures having controllable light modulation. For example, an optical structure may include an electrically controllable optically active material that provides controlled transition between a privacy or scattering state and a visible or transmittance state. To make electrical connections with electrode layers that control the optically active material, the optical structure may include electrode engagement regions. In some examples, the electrode engagement regions are formed as notches in peripheral edges of opposed panes bounding the optically active material. The notches may or may not overlap to provide a through conduit in the region of overlap for wiring. In either case, the notches may allow the remainder of the structure to have a flush edge surface for ease of downstream processing.

Figure 1:
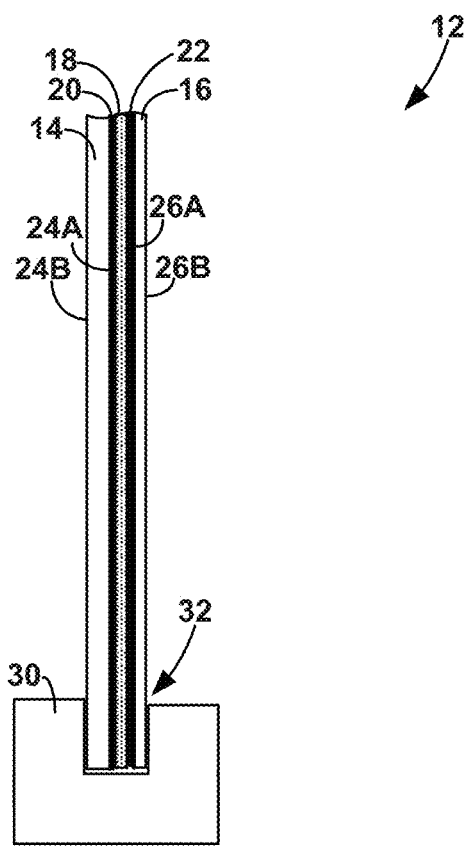
FIG. 1 is a side view of an example privacy glazing structure.

FIG. 1 is a side view of an example privacy glazing structure 12 that includes a first pane of transparent material 14 and a second pane of transparent material 16 with a layer of optically active material 18 bounded between the two panes of transparent material. The privacy glazing structure 12 also includes a first electrode layer 20 and a second electrode layer 22. The first electrode layer 20 is carried by the first pane of transparent material 14 while the second electrode layer 22 is carried by the second pane of transparent material. In operation, electricity supplied through the first and second electrode layers 20, 22 can control the optically active material 18 to control visibility through the privacy glazing structure.

As described in greater detail below, the first and second panes of transparent material 14, 16 may each have an electrical connection notch formed in their edge. The notch may define a cutout that is offset from the remainder of the edge. The notch on the first pane 14 can provide access to an underlying electrode layer (second electrode layer 22) carried by second pane 16. Similarly, the notch on the second pane 16 can provide access to an underlying electrode layer (first electrode layer 20) carried by first pane 14. While the notches on the first and second panes 14, 16 may provide an offset cavity for making electrical connections, the remainder of the edge of privacy glazing structure may be substantially flush, e.g., such that there is substantially no offset between the terminal or peripheral edges of the first and second panes 14, 16. The electrical connection configuration of privacy glazing structure 12 can have a variety of different configurations as described in greater detail herein.

Privacy glazing structure 12 can utilize any suitable privacy materials for the layer of optically active material 18. Further, although optically active material 18 is generally illustrated and described as being a single layer of material, it should be appreciated that a structure in accordance with the disclosure can have one or more layers of optically active material with the same or varying thicknesses. In general, optically active material 18 is configured to provide controllable and reversible optical obscuring and lightening. Optically active material 18 can be an electronically controllable optically active material that changes direct visible transmittance in response to changes in electrical energy applied to the material.

In one example, optically active material 18 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 18 is formed of a liquid crystal material. Different types of liquid crystal materials that can be used as optically active material 18 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 20 and 22. When the electric field is off, the liquid crystals may be randomly scattered. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but light scattering upon application of an electric field.

In one example in which the layer of optically active material 18 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 18, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 28 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 18 may contain spacer beads (e.g., micro-spheres), for example having an average diameter ranging from 3 micrometers to 40 micrometers, to maintain separation between the first pane of transparent material 14 and the second pane of transparent material 16.

In another example in which the layer of optically active material 18 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 18.

Another type of material that can be used as the layer of optically active material 18 is a suspended particle material. Suspended particle materials are typically dark or opaque in a non-activated state but become transparent when a voltage is applied. Other types of electrically controllable optically active materials can be utilized as optically active material 18, and the disclosure is not limited in this respect.

Independent of the specific type of material(s) used for the layer of optically active material 18, the material can change from a light transmissive state in which privacy glazing structure 12 is intended to be transparent to a privacy state in which visibility through the insulating glazing unit is intended to be reduced. Optically active material 18 may exhibit progressively decreasing direct visible transmittance when transitioning from a maximum light transmissive state to a maximum privacy state. Similarly, optically active material 18 may exhibit progressively increasing direct visible transmittance when transitioning from a maximum privacy state to a maximum transmissive state. The speed at which optically active material 18 transitions from a generally transparent transmission state to a generally opaque privacy state may be dictated by a variety factors, including the specific type of material selected for optically active material 18, the temperature of the material, the electrical voltage applied to the material, and the like.

Depending on the type of material used for optically active material 18, the material may exhibit controllable darkening. As noted above, controllable darkening refers to the ability of the optically active material to transition between a high visible light transmission state (a bright state), a low visible light transmission dark state, and optionally intermediate states therebetween, and vice versa, by controlling an external energy source applied to the optically active material. When optically active material 18 is so configured, the visible transmittance through the cell containing optically active material 18 (e.g., in addition to other substrates and/or laminate layers bounding the optically active material and forming the cell) may be greater than 40% when optically active material 22 is transitioned to the high visible transmission state light state, such as greater than 60%. By contrast, the visible transmittance through the cell may be less than 5 percent when optically active material 18 is transitioned to the low visible light transmission dark state, such as less than 1%. Visible transmittance can be measured according to ASTM D1003-13.

Additionally or alternatively, optically active material 18 may exhibit controllable light scattering. As noted above, controllable light scattering refers to the ability of the optically active material to transition between a low visible haze state, a high visible haze state, and optionally intermediate states therebetween, and vice versa, by controlling an external energy source. When optically active material 18 is so configured, the transmission haze through the cell containing optically active material 18 may be less than 10% when optically active material 18 is transitioned to the low visible haze state, such as less than 2%. By contrast, the transmission haze through the cell may be greater than 85% when optically active material 18 is transitioned to the high visible haze state and have a clarity value below 50%, such as a transmission haze greater than 95% and a clarity value below 30%. Transmission haze can be measured according to ASTM D1003-13. Clarity can be measured using a BYK Gardener Haze-Gard meter, commercially available from BYK-GARDNER GMBH.

To electrically control optically active material 18, privacy glazing structure 12 in the example of FIG. 1 includes first electrode layer 20 and second electrode layer 22. Each electrode layer may be in the form of an electrically conductive coating deposited on or over the surface of each respective pane facing the optically active material 18. For example, first pane of transparent material 14 may define an inner surface 24A and an outer surface 24B on an opposite side of the pane. Similarly, second pane of transparent material 16 may define an inner surface 26A and an outer surface 26B on an opposite side of the pane. First electrode layer 20 can be deposited over the inner surface 24A of the first pane, while second electrode layer 22 can be deposited over the inner surface 26A of the second pane. The first and second electrode layers 20, 22 can be deposited directed on the inner surface of a respective pane or one or more intermediate layers, such as a blocker layer, and be deposited between the inner surface of the pane and the electrode layer.

Each electrode layer 20, 22 may be an electrically conductive coating that is a transparent conductive oxide ("TCO") coating, such as aluminum-doped zinc oxide and/or tin-doped indium oxide. The transparent conductive oxide coatings can be electrically connected to a power source through notch structures as described in greater detail below. In some examples, the transparent conductive coatings forming electrode layers 20, 22 define wall surfaces of a cavity between first pane of transparent material 14 and second pane of transparent material 16 which optically active material 18 contacts. In other examples, one or more other coatings may overlay the first and/or second electrode layers 20, 22, such as a dielectric overcoat (e.g., silicon oxynitride). In either case, first pane of transparent material 14 and second pane of transparent material 16, as well as any coatings on inner faces 24A, 26A of the panes can form a cavity or chamber containing optically active material 18.

For example, one or both of the panes of transparent material 14, 16 bounding the optically active material can have an alignment layer bounding and contacting optically active material 18. The alignment layer can be deposited over any underlying layers carried by the pane, such as an electrode layer, an underlying transparent dielectric blocking layer (e.g., silicone oxide), and/or transparent dielectric overcoat. The alignment layer can help reduce or eliminate Mura (blemish) defects, e.g., by changing the surface energy and/or surface interactions between optically active material 18 and the surface of pane contacting the optically active material. In one example, the alignment layer is implemented by a layer containing polyimide (e.g., formed by coating the surface with a coating containing polyimide). The polyimide layer may or may not be rubbed to modify the properties of the layer and corresponding interactions with optically active layer 18.

The panes of transparent material forming privacy glazing structure 12, including first pane 14 and second pane 16, can be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In some examples, first pane 14 and/or second pane 16 may be formed from multiple different types of materials. For example, the substrates may be formed of a laminated glass, which may include two panes of glass bonded together with a polymer such as polyvinyl butyral. Additional details on privacy glazing substrate arrangements that can be used in the present disclosure can be found in U.S. patent application Ser. No. 15/958,724, titled "HIGH PERFORMANCE PRIVACY GLAZING STRUCTURES" and filed Apr. 20, 2018, the entire contents of which are incorporated herein by reference.

Privacy glazing structure 12 can be used in any desired application, including in a door, a window, a wall (e.g., wall partition), a skylight in a residential or commercial building, or in other applications. To help facilitate installation of privacy glazing structure 12, the structure may include a frame 30 surrounding the exterior perimeter of the structure. In different examples, frame 30 may be fabricated from wood, metal, or a plastic material such a vinyl. Frame 30 may defines a channel 32 that receives and holds the external perimeter edge of structure 12. The sightline through privacy glazing structure 12 is generally established as the location where frame 30 ends and visibility through privacy glazing structure 12 begins.

Figure 2:
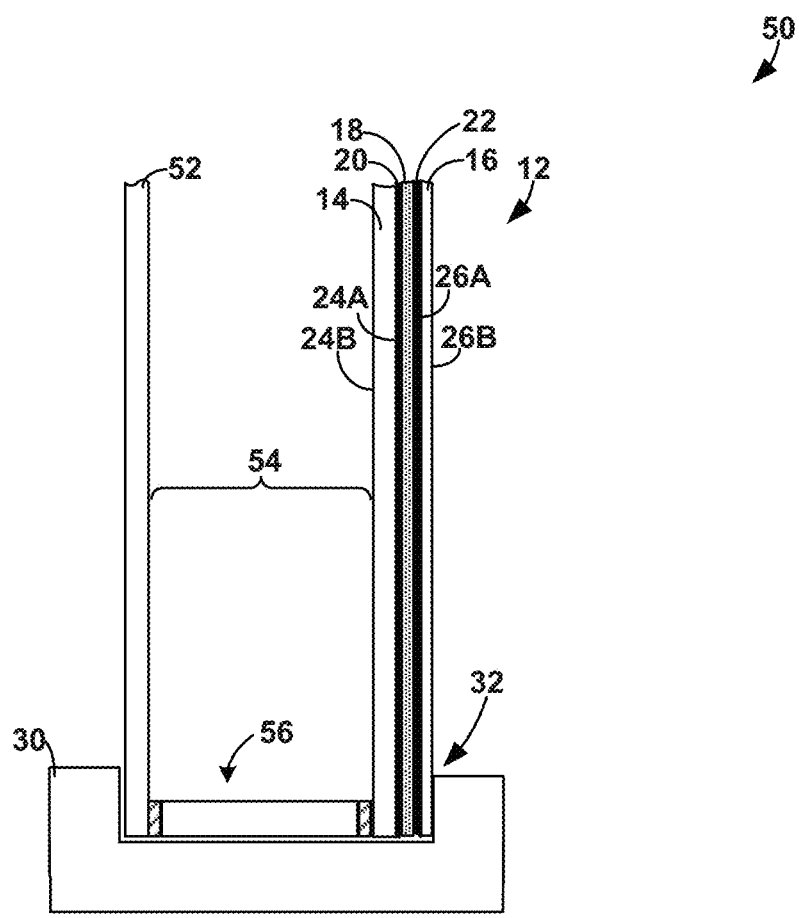
FIG. 2 is a side view of the example privacy glazing structure of FIG. 1 incorporated into a multi-pane insulating glazing unit.

In the example of FIG. 1, privacy glazing structure 12 is illustrated as a privacy cell formed of two panes of transparent material bounding optically active material 18. In other configurations, privacy glazing structure 12 may be incorporated into a multi-pane glazing structure that include a privacy cell having one or more additional panes separated by one or more between-pane spaces. FIG. 2 is a side view of an example configuration in which privacy glazing structure 12 from FIG. 1 is incorporated into a multi-pane insulating glazing unit having a between-pane space.

As shown in the illustrated example of FIG. 2, a multi-pane privacy glazing structure 50 may include privacy glazing structure 12 separated from an additional (e.g., third) pane of transparent material 52 by a between-pane space 54 by a spacer 56. Spacer 56 may extend around the entire perimeter of multi-pane privacy glazing structure 50 to hermetically seal the between-pane space 56 from gas exchange with a surrounding environment. To minimize thermal exchange across multi-pane privacy glazing structure 50, between-pane space 54 can be filled with an insulative gas or even evacuated of gas. For example, between-pane space 54 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 54 may be evacuated so that the between-pane space is at vacuum pressure relative to the pressure of an environment surrounding multi-pane privacy glazing structure 50.

Spacer 56 can be any structure that holds opposed substrates in a spaced apart relationship over the service life of multi-pane privacy glazing structure 50 and seals between-pane space 54 between the opposed panes of material, e.g., so as to inhibit or eliminate gas exchange between the between-pane space and an environment surrounding the unit. One example of a spacer that can be used as spacer 56 is a tubular spacer positioned between first pane of transparent material 14 and third pane of transparent material 52. The tubular spacer may define a hollow lumen or tube which, in some examples, is filled with desiccant. The tubular spacer may have a first side surface adhered (by a first bead of sealant) to the outer surface 24B of first pane of transparent material 14 and a second side surface adhered (by a second bead of sealant) to third pane of transparent material 52. A top surface of the tubular spacer can exposed to between-pane space 54 and, in some examples, includes openings that allow gas within the between-pane space to communicate with desiccating material inside of the spacer. Such a spacer can be fabricated from aluminum, stainless steel, a thermoplastic, or any other suitable material. Advantageous glazing spacers are available commercially from Allmetal, Inc. of Itasca, Ill., U.S.A.

Another example of a spacer that can be used as spacer 56 is a spacer formed from a corrugated metal reinforcing sheet surrounded by a sealant composition. The corrugated metal reinforcing sheet may be a rigid structural component that holds first pane of transparent material 14 apart from third pane of transparent material 52. Such a spacer is often referred to in commercial settings as swiggle spacer. In yet another example, spacer 56 may be formed from a foam material surrounded on all sides except a side facing a between-pane space with a metal foil. Such a spacer is commercially available from Edgetech under the trade name Super Spacer®. As another example, spacer 56 may be a thermoplastic spacer (TPS) spacer formed by positioning a primary sealant (e.g., adhesive) between first pane of transparent material 14 and third pane of transparent material 52 followed, optionally, by a secondary sealant applied around the perimeter defined between the substrates and the primary sealant. Spacer 56 can have other configurations, as will be appreciated by those of ordinary skill in the art.

Depending on the application, first patent of transparent material 14, second pane of transparent material 16, and/or third pane of transparent material 52 (when included) may be coated with one or more functional coatings to modify the performance of privacy structure. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. Advantageous low-emissivity coatings include the LoE-180™, LoE-272™, and LoE366™ coatings available commercially from Cardinal CG Company of Spring Green, Wis., U.S.A. A photocatalytic coating, by contrast, may be a coating that includes a photocatalyst, such as titanium dioxide. In use, the photocatalyst may exhibit photoactivity that can help self-clean, or provide less maintenance for, the panes. Advantageous photocatalytic coatings include the NEAT® coatings available from Cardinal CG Company.

Figure 3:
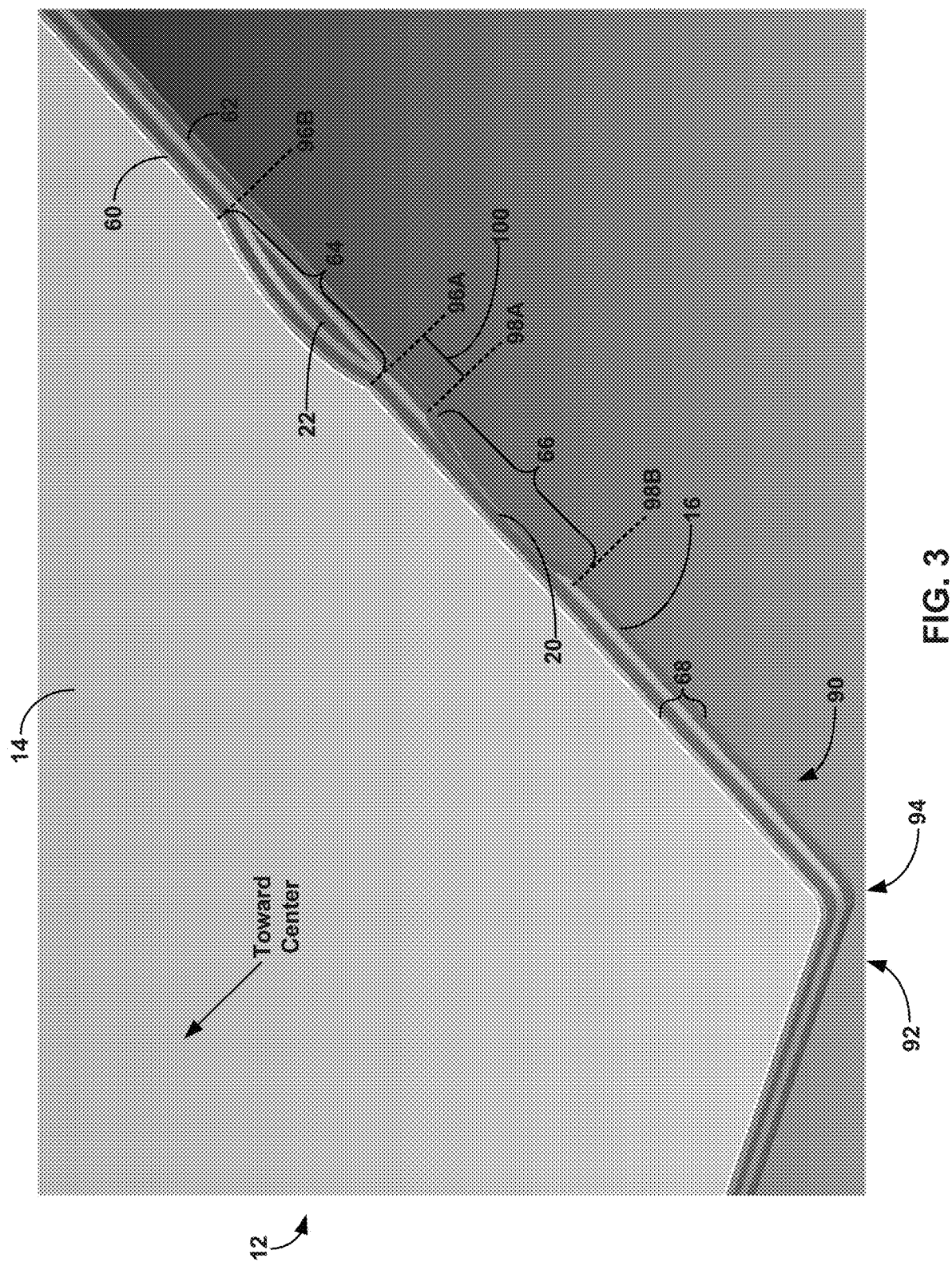
FIG. 3 is a perspective view of an example edge configuration of a privacy structure that includes electrical connection notches.

As briefly mentioned above, the panes of transparent material forming privacy glazing structure 12, whether implemented alone or in the form of a multiple-pane structure with a between-pane space, can include electrical connection regions to facilitate making electrical connections with first electrode layer 20 and second electrode layer 22. FIG. 3 is a perspective view of an example edge configuration of privacy glazing structure 12 that includes electrical connection notches.

In the illustrated configuration of FIG. 3, first pane of transparent material 14 defines a peripheral edge 60 and second pane of transparent material 16 defines a peripheral edge 62. The peripheral edges of the panes can constitute the outer boundary or periphery of each respective pane. The first pane of transparent material 14 defines a first notch 64, while the second pane of transparent material 16 defines a second notch 66. Each notch may be a cut out, void space, groove, recess, or other inwardly extending opening from the remainder of the peripheral edge. The first notch 64 can extend inwardly from the peripheral edge surface 68 of privacy glazing structure 12 toward a geometric center of first pane 14. The second notch can likewise extend inwardly from the peripheral edge surface 68 of privacy glazing structure 12 toward a geometric center of second pane 16. The peripheral edge surface 68 of privacy glazing structure 12 may be defined by the combined peripheral edge surfaces of first pane 14, second pane 16, and any gasket material or edge sealant therebetween.

In general, first notch 64 may have a depth sufficient to expose the underlying second electrode layer 22 carried by the underlying second pane of transparent material 16. Likewise, the second notch 66 may have a depth sufficient to expose the underlying first electrode layer 20 carried by the underlying first pane of transparent material 14. Accordingly, the notch on each pane can provide access to the electrode layer carried by the opposite pane, thereby providing access for making an electrical connection between the electrode layer and a power source.

Each notch 64, 66 may have a size sufficient to connect an electrical conductor to an underlying electrode layer within the notch. However, the size of each notch may be minimized to avoid encroaching into the sightline through privacy glazing structure 12 and limiting the amount of the structure consumed for electrical connections. In some examples, each notch may have a size greater than 10 square millimeters, such as greater than 25 square millimeters, greater than 50 square millimeters, or greater than 100 square millimeters. Additionally or alternatively, the size of each notch may be less than 1000 square millimeters, such as less than 750 square millimeters, or less than 500 square millimeters. For example, the size of each notch may range from 5 square millimeters to 1000 square millimeters, such as from 25 square millimeters to 600 square millimeters, from 50 square millimeters to 400 square millimeters, or from 100 square millimeters to 300 square millimeters. The first notch 64 may be the same size and/or shape as the second notch 66 or may have a different size and/or shape.

In general, each notch 64, 66 can define any polygonal (e.g., square, hexagonal) or arcuate (e.g., circular, elliptical) shape, or even combinations of polygonal and arcuate shapes. In some examples, first notch 64 and second notch 66 each have a curved shape extending from first peripheral edge 60 and second peripheral edge 62, respectively, toward a center of the first and second panes. The curved shape may be characterized by rounded edges that are devoid of sharp angles where surfaces converge that may provide stress fracture and breakage locations. That being said, in other examples, first notch 64 and/or second notch may define a polygonal shape (e.g., rectangle, trapezoid) having sharp intersecting edges, and the disclosure is not limited in this respect.

In some examples where first notch 64 and/or second notch 66 have a curved shape, the curved shape may include or be a semi-circular shape when looking at the outer face 24B and/or 26B of the first and/or second pane. The peripheral edge of the first pane 14 and/or second pane 16 may bisect the semi-circular shape or may form a chord across the semi-circular shape such that the semi-circular shape is not a full half circle.

Figure 4A:
FIGS. 4A-4D illustrate example cross-sectional shapes that may be used for an electrical connection notch.

FIGS. 4A-4D illustrate example cross-sectional shapes that may be used for first notch 64 and/or second notch 66 (e.g., in the cross-sectional plane defining outer face 24B and/or 26B of first pane 14 and second pane 16, respectively). In the example of FIG. 4A, a notch 70 having a semi-circular cross-sectional shape is illustrated. The semi-circular shape may be symmetric about a center line 72 that divides the notch into two equal-area halves. In different examples, the semi-circular shape can be defined by a constant radius of curvature or a radius of curvature that varies across the shape. In some examples, the radius of curvature of notch 70 is greater than 1 mm, such as greater than 3 mm. If the radius of curvature of notch 70 is too small, there may be an increased tendency for cracks or fractures at the notch.

Figure 4B:

The angle 74 at which the terminal edges 76 of notch 70 intersects the peripheral edge of the transparent pane can vary, e.g., depending on the shape of the notch. In general, the angle 74 may range from 10 degrees to 90 degrees, such as from 25 degrees to 75 degrees. FIG. 4B illustrates another example of notch 70 where the notch has a generally semi-circular shape with terminal edges that flare outwardly to form an angle of intersection less than 45 degrees, such as less than 30 degrees, or less than 15 degrees. The flare may be characterized by an inflection point along the perimeter of the notch where the notch transitions from a lesser radius of curvature to a greater radius of curvature. Configuring a notch with a flared terminal edge may help reduce edge stresses and/or provide additional opening space for routing wiring.

Figure 4C:

FIG. 4C illustrates an example asymmetrical configuration of a notch 70 where the notch has a semi-circular portion 78 and a tail portion 80. The tail portion 81 extends parallel to the length of the peripheral edge and has a width toward the center of the transparent pane less than the width of the semi-circular portion 78. As a result, a first terminal edge 76A of the notch intersects the peripheral edge at an intersection angle 74A greater than the intersection angle 74B at which a second terminal edge 76B of the notch intersects the peripheral edge. Configured a notch with a tail portion running parallel to the length of the peripheral edge may be useful to route wiring extending from the notch into the tail (e.g., and recessed relative to the peripheral edge).

Figure 4D:
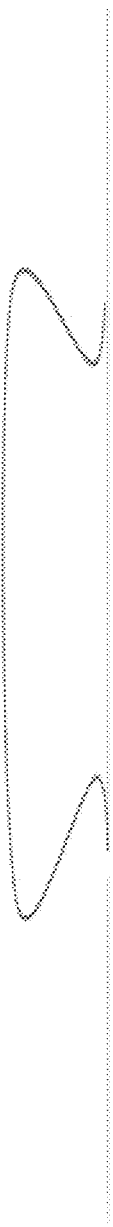

FIG. 4D illustrates yet another example configuration of a notch 70 in which the notch has a dovetail shape. The dovetail shape may be characterized as a mortise broader at its end than its base with flaring side edges. The dovetail shape may be useful to receive an insert cover after making electrical connections to the underlying electrode layer.

Figure 5:
FIG. 5 illustrates example notch dimensions that can be used for electrical connection notches according to the disclosure.

While first notch 64 and/or second notch 66 have any suitable shape, in some examples, the notch(es) have a length greater than a width. FIG. 5 illustrates an example notch 80 that can be used as first and/or second notch 64, 66. Notch 80 has a length 82 extending parallel to the peripheral edge 84 of the pane. Notch 80 also has a maximum width 86 extending from peripheral edge 84 toward a center of the pane. Configuring notch 80 with a length 82 greater than a width 86 may be useful to increase the area of the notch while limiting the extent to which the notch creeps into the sightline through frame 30 (FIGS. 1 and 2). In some examples, notch 80 has a length ranging from 10 mm to 100 mm, such as from 20 mm to 50 mm. Additionally or alternatively, notch 80 may have a width 86 less than 25 mm, such as less than 12 mm. For example, notch 80 may have a width 86 ranging from 3 mm to 9 mm. As noted, limiting the width 86 of notch 80 may be useful to prevent the notch from being visible to an user looking through privacy glazing structure 12 once installed in frame 30 and/or limit the extent to which the notch creeps above the bottom surface of the frame.

With further reference to FIG. 3, first pane of transparent material 14 defines peripheral edge 60 and second pane of transparent material 16 defines peripheral edge 62. When assembled into privacy glazing structure 12, the peripheral edges 60, 62 of the two panes may be flush such that the resulting peripheral edge surface 68 of the structure is flush. The peripheral edges 60, 62 may be flush in that the surfaces of the edges defining the thickness of the panes may be substantially co-planar. For example, the peripheral edges 60, 62 may be sufficiently aligned that the peripheral edge surface 68 of privacy glazing structure 12 can be placed on a flat surface (e.g., of a conveyance roller or piece of processing equipment) without causing the structure to tilt toward one side or the other because of unevenness of the two panes. The degree of offset between the peripheral edge 60 of first pane 14 and peripheral edge 62 of second pane 16, if any, may be within certain manufacturing tolerances, such as less than 5 mm, less than 3 mm, less than 1 mm, or less than 0.5 mm. While electrical connection notches as described herein may be beneficially implemented on a structure that includes opposed panes that are positioned to have flush, co-planar peripheral edges, it is contemplated that the notch structures can also be implemented in configurations where opposed panes are offset, or not flush.

Depending on the shape of first pane of transparent material 14 and second pane of transparent material 16, the panes may have multiple sides in which first notch 64 and second notch 66 may be formed. For example, first pane 14 and second pane 16 may each define a polygonal shape (e.g., square, rectangular, hexagonal), an arcuate shape (e.g., circular, elliptical) shape, or combinations of polygonal and arcuate shapes (e.g., rectangle transitioning into a semicircle). When first pane 14 and second pane 16 are implemented using a polygonal shape, each side of the polygon can define a peripheral edge surface in which first notch 64 and second notch 66, respectively, can be formed. In some examples, the first notch 64 and second notch 66 are positioned on the same side of the polygonal shape of first pane 14 and second pane 16, respectively. This can be useful to provide a common side of privacy glazing structure 12 for making electrical connections and routing wiring. In other configurations, however, the first notch 64 and second notch 66 may be positioned on different sides of first pane 14 and second pane 16, respectively.

In the example of FIG. 3, which is a partial perspective view of first pane 14 and second pane 16, the panes each define a rectangular shape that includes a first side 90 and a second side 92. The two sides intersect at a corner 94. As shown in this example, first notch 64 and second notch 66 are both positioned on the first side 90 of the panes.

Positioning first notch 64 and second notch 66 in close proximity can be useful to facilitate routing and positioning of wiring and electrical contact hardware. In some configurations, first notch 64 and second notch 66 are positioned side-by-side to each other in either overlapping or non-overlapping configuration. In an overlapping configuration discussed in greater detail with respect to FIG. 6, adjacent terminal edges of the first and second notches may be crossed over each other. By contrast, in a non-overlapping configuration, adjacent terminal edges of the first and second notches may be offset from each other.

In the example illustrated in FIG. 3, first notch 64 defines a first terminal edge 96A and a second terminal edge 96B. Similarly, second notch 66 defines a first terminal edge 98A and a second terminal edge 98B. The terminal edges of the notches may be the location where peripheral edges 60 and 62 intersect the boundaries of first and second notch 64, 66, respectively. A lateral separation distance 100 between adjacent first terminal edge 96A and of first notch 64 and first terminal edge 98A of second notch 66 may be less than 100 mm, such as less than 50 mm, or less than 25 mm. For example, lateral separation distance 100 may range from 1 mm to 25 mm, such as from 5 mm to 15 mm.

Independent of the positioning of the notches relative to each other, in some example, the terminal edge of each notch is separated from a nearest corner or parallel peripheral edge surface by a minimum distance. For example, in the configuration of FIG. 3, second terminal notch 98B may be separated from corner 94 by the minimum distance. The minimum distance may be at 50 millimeters, such as at least 75 millimeters. Separating the terminal edges of the notches a threshold distance from adjacent corner(s) can be helpful to prevent fractures or cracking.

Figure 6:
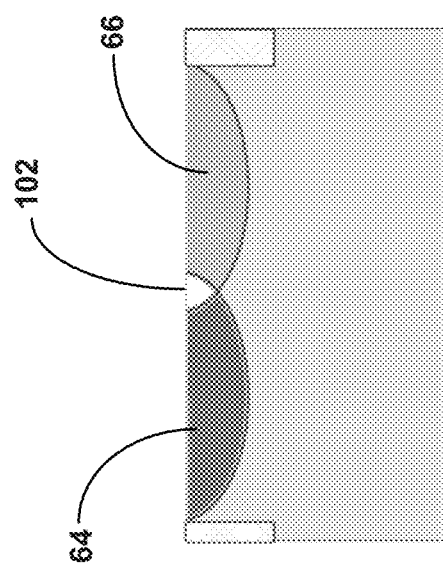
FIG. 6 is a top view illustration showing an example configuration in which two notches overlap to form a conduit through a region of overlap.

As mentioned above, first notch 64 and second notch 66 may be positioned side-by-side to each other in an overlapping configuration. When arranged to overlap each other, a conduit or opening can be formed through the thickness of privacy glazing structure 12 where the notches overlap. FIG. 6 is a top view illustration showing an example configuration in which first notch 64 and second notch 66 overlap to form a conduit 102 through the region of overlap. The size of the conduit 102 may vary, e.g., depending on the size of first and second notches 64, 66 and the extent to which the notches overlap. In some examples where privacy glazing structure 12 includes a conduit 102, however, the size of the conduit may range from 1 square millimeter to 100 square millimeters, such as from 2 square millimeter to 25 square millimeter, or from 5 square millimeter to 20 square millimeter. For example, a ratio of the area of first notch 64 and/or second notch 66 (including the area occupied by the conduit) divided by the area of the conduit may range from 5:1 to 20:1, such 10:1 to 15:1.

Figure 7:
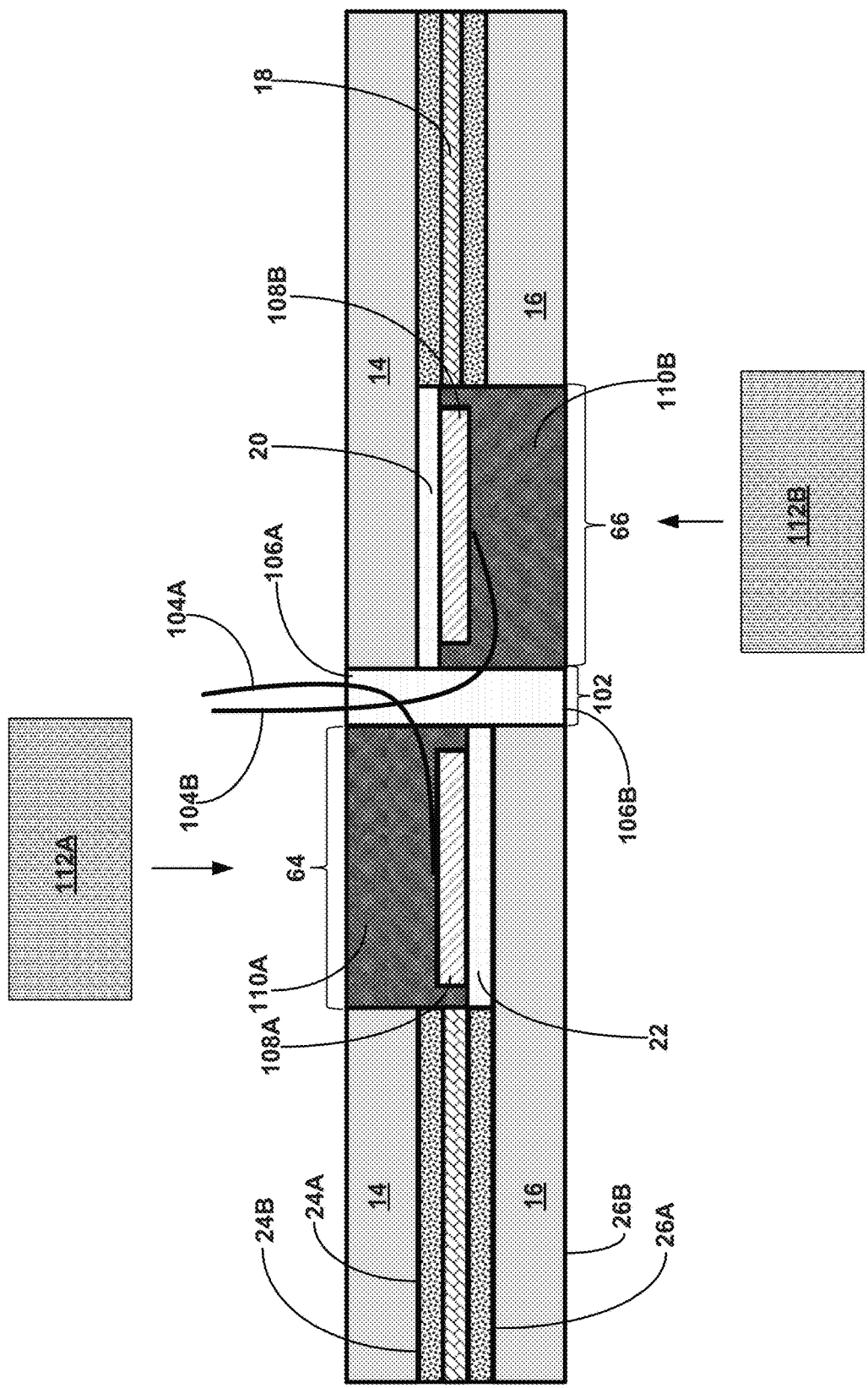
FIG. 7 is a side view illustrating an example arrangement of features where a first notch overlaps with a second notch.

FIG. 7 is a side view illustrating an example arrangement of features where first notch 64 overlaps with second notch 66. As shown, first notch 64 in privacy glazing structure 12 extends through the thicknesses of the first pane of transparent material 14, the first electrode layer 20, and the electrically controllable optically active material 18. As a result, access to the second electrode layer 22 on the inner face 26A of the second pane of transparent material 16 is provided from the outer face 24B of the first pane 14 via first notch 64. Similarly, the second notch 66 extends through the thicknesses of the second pane of transparent material 16, the second electrode layer 22, and the electrically controllable optically active material 18. As a result, access to the first electrode layer 20 on the inner face 24A of the first pane of transparent material 14 is provided from the outer face 26B of the second pane 16.

Access to the first electrode layer 20 and second electrode layer 22 can be provided by routing an electrical conductor through the outer face and inner face of the opposite pane via a respective notch, thereby electrically connecting the electrical conductor to the electrode layer on the inner face of the pane carrying the layer. In other examples, an electrical conductor used to electrically connect the first electrode layer 20 and/or second electrode layer 22 may be routed at least partially through conduit 102 to connect the electrical conductor to the electrode layer.

The example of FIG. 7 illustrates wiring positioned in conduit 102 and electrically connected to first electrode layer 20 and second electrode layer 22. The wiring may be further connected to a power source, such as a driver or controller that provides power and/or control signals to control optical active material 18. In the illustrated example, the wiring is illustrated as including a first wire 104A connected to the first electrode layer 20 and a second wire 104B connected to the second electrode layer 22. In general, the term wiring refers to any flexible electrical conductor, such as a thread of metal optionally covered with an insulative coating, a flexible printed circuit, a bus bar, or other electrical connector extending from outside the perimeter of first and second panes 14, 16 to the electrode layers carried by the panes via first and second notches 64, 66. It should be appreciated that wiring may be used to connect first and second electrode layers 20, 22 to a power source in configurations where privacy glazing structure 12 does not include conduit 102 and this discussion is not limited to the example configuration of FIG. 7

In configurations where privacy glazing structure 12 includes overlapping notches to form conduit 102, the conduit can extend at least partially, and in the illustrated configuration fully, through the thickness of the first and second panes. Accordingly, conduit may define a first open end 106A through the outer face 24B of the first pane 14 and a second open end 106B through the outer face 26B of the second pane 16. In some examples, wiring is routed through both ends of the conduit to connect to first electrode layer 20 and second electrode layer 22. In other examples, wiring is routing only through a single open end of the conduit. For example, in the example of FIG. 7, first wire 104A and second wire 104B both enter conduit 102 through the first open end 106A of the conduit. First wire 104A bends approximately 90 degrees to transition from conduit 102 to first electrode layer 20. Second wire 104B bends approximately 180 degrees to transition from conduit 102 to second electrode layer 22. This arrangement may allow wiring to be run on one side of the structure (e.g., the side having the conduit opening through which the wiring enters) but not the other side, making wiring routing easier and less space intensive. When wiring is routed to enter through only a single opening of conduit 102, the conduit may not extend through the structure to define a second opening and/or the second opening may be filled.

The wiring used to electrically connect the first and second electrode layers 20, 22 to a power source can be mechanically affixed to the electrode layers. In general, any type of mechanical fixation feature can be used to secure the wiring to the electrode layers. As one example, each wire 104A, 104B may include a conductive clip (e.g., alligator clip) that grabs the edge of pane within the notch. As another example, each wire 104A, 104B may be bonded to a respective electrode layer using a bonding agent. For example, each wire may be bonded using ultrasonic solder, an anisotrope conductive film (ACF), a conductive epoxy, a pressure sensitive conductive transfer tape, or yet other electrically conductive bonding agent.

In different examples, the wiring may be attached directly to the electrode layer, or the wiring may terminate in an electrode which, in turn, is attached to the electrode layer using any of the techniques discussed above. In the example of FIG. 7, first wire 104A is illustrated as having a first electrode 108A attached at its terminal end, and second wire 104B is illustrated as having a second electrode 108B attached at its terminal end. Each electrode may be formed of an electrically conductive material (e.g., metal) and may have a cross-sectional area greater than that of the wire to which the electrode is attached.

After suitably connecting the wiring to the electrode layers, first notch 64, second notch 66, and conduit 102 (when included) may be left open or may be filled. Filling the openings can provide additional mechanical support for the electrical connections within the openings, electrical shielding, and/or protection from external elements such as moisture. To fill the first and second notches 64, 66, a cover filling material may be introduced into the notches. In the example of FIG. 7, a first cover material filling 110A is illustrated as filling first notch 64 and a second cover material 110B is illustrated as filling second notch 66. First cover filling material 110A and second cover filling material 110B may be the same material or different materials. Further, although no illustrated in FIG. 7, conduit 102 may also be filled with a cover filling material which, again, may be the same material as first cover filling material 110A and/or second cover filling material 110B or may be a different material.

In some examples, the first cover filling material 110A and/or second cover filling material 110B is or includes a polymeric sealant, such as a conformal coating or a potting/encapsulant material that is flowably filled into the notch(es) and set within the notches. Example polymeric materials that may be used include silicone-based materials, epoxy-based materials, acrylate-based materials, and urethane-based materials.

Additionally or alternatively, a cover plate may be installed to function as the first cover filling material 110A and/or second cover filling material 110B. The cover plate may be rigid (e.g., substantially unbendable under hand pressure) or flexible. The cover plate may have a footprint (e.g., size and/or shape) mirroring the notch into which the cover plate is to be inserted. In some examples, a polymeric sealant is deposited in the notch to be filled and a cover plate inserted into the notch over the sealant. The cover plate may have a thickness effective so that, once installed into the notch, the cover plate is substantially flush with the outer surface of the pane into which the cover plate is inserted (e.g., +/−0.2 mm). Further, the cover plate may have a length and width effective so the peripheral edge of the cover plate is flush with the reminder of the peripheral edge of the privacy structure.

In some examples, the cover plate may have a thickness less than or equal to the thickness of the pane defining the notch into which the cover plate is to be inserted. For example, the cover plate may have a thickness that falls within a range from being 0.1 mm thinner than the pane defining the notch into which the cover plate is to be inserted to 0.5 mm thinner. In some examples, first pane 14 and second pane 16 may have a thickness ranging from 2 mm to 6 mm. Accordingly, in these examples, the cover plate may have a thickness less than 6 mm, such as less than 3 mm, or less than 2 mm.

Example materials that may be used to form a rigid cover plate include ceramic materials and glass materials. For example, the cover plate may be fabricated from soda lime silica glass, sodium borosilicate glass, aluminosilicate glass, or fused silica. In one example, the cover plate is formed of the same material (and thereby has substantially the same optical characteristics) as the pane defining the notch into which the cover plate is to be inserted. Example materials that may be used to form a flexible cover plate include polymeric films, such as polyethylene terephthalate (PET), polyvinyl chloride (PVC), and polyurethane.

When used, the first cover filling material 110A and/or second cover filling material 110B may electrically isolate the underlying electrical connection(s) and protect the connections against moisture ingress. Accordingly, the cover filling material may have a surface electrical conductivity of less than 1 Mohm and/or have a moisture transmission of less than 1 g/square meter/day at 95% relative humidity and 20 degrees Celsius.

To help hold the cover plate in the notch into which the cover plate is inserted, the wall surfaces of the notch may be sloped from the outer face to the inner face. That is, rather than forming the wall surfaces bounding the notch to extend perpendicularly (zero degree angle) from the outer face to the inner face, the wall surfaces may extend at a non-zero degree angle with respect to normal. When so configured, the non-zero degree angle may range from 15 to 75 degrees relative to normal. Sloping the wall surfaces may help form a tongue-and-groove structure with corresponding sloped wall surfaces of the cover plate, helping the cover plate to nest and be secured in the notch. FIGS. 8A and 8B illustrate example sloped notch wall surfaces that may be used on a notch according to the disclosure. The examples show the wall surfaces of first notch 64 sloping at an angle 112 relative to normal from the outer face 24B to the inner face 24A.

To bond and/or seal the first pane of transparent material 14 to the second pane of transparent material 16 with optically active material 18 between the two panes, a seal may be positioned between the two panes. The seal may be implemented using one or more polymeric sealants that are positioned to extend around the perimeter of the first pane of transparent material 14 and the second pane of transparent material 16, e.g., adjacent to and/or in contact with the peripheral edge surface 68. The sealant(s) may bond the first pane of transparent material 14 to the second pane of transparent material 16 about their perimeter, e.g., to prevent ingress or egress of liquid from the region bounded by the sealant(s). For example, the sealants may hold liquid optically active material 18 between the panes within the region bounded by the sealant(s) and/or inhibit external moisture from reaching the optically active material.

Without wishing to be bound by any particular theory, it is has been found in some applications that positioning the sealant over the electrode layers of the optical structure such that electricity is conveyed through the seal during operation of the structure has a tendency to accelerate degradation of the sealant. Accordingly, in some configurations, the electrode layers are offset from the peripheral edge of the transparent panes about which the sealant extends. For example, the electrode layers may be removed (e.g. via grinding or laser ablation) such that the perimeter region over which the sealant extends is devoid of one or both electrode layers and/or the electrode layers are otherwise deactivated in the region. Alternatively, the electrode layers may be deposited on the panes so that the electrode layers do not extend over the surface where the sealants are to be deposited.

FIGS. 9A and 9B are views of the inner surface 24A and 26A of the first and second panes of transparent material 14 and 16, respectively, showing example electrode layer arrangements. As shown in FIG. 9A, first electrode layer 20 is offset from the perimeter around the pane over which the seal is to be deposited. In particular, in the illustrated example, first electrode layer 20 is offset a distance 120A from the peripheral edge 60 of the first pane. Similarly, as shown in FIG. 9B, second electrode layer 22 is offset from the perimeter around the pane over which the seal is to be deposited. In the illustrated example, second electrode layer 22 is offset a distance 120B from the peripheral edge 62 of the second pane. Because electricity will not pass between the first and second pane 14, 16 in the region where the first electrode layer 20 and/or second electrode layer 22 is offset (e.g., missing, devoid), electricity will not transfer through sealant positioned in this region during operation of the device. While the offset distances 120A and 120B may vary, e.g., depending on the width of sealant to be deposited, in some examples, one or both distances may range from 1 mm to 25 mm, such as from 5 mm to 15 mm.

While offsetting one or both electrode layers may be useful to help prevent electricity from flowing through a perimeter seal during operation, the electrode layers may nevertheless extend under the region accessible by an overlying notch in order to make electrical connections. To facilitate these electrical connections where an electrode layer is offset from the peripheral edge, the electrode layer may have a contact portion that extends towards and/or to the peripheral edge from a remainder of the offset electrode layer. The contact portion can be sized and shaped to underlay the region of the pane exposed by an overlying notch for making electrical connections.

In the example of FIG. 9A, first electrode layer 20 includes a first contact portion 122A extending from peripheral edge 60 of first pane 14 to a remainder of the first electrode layer that is offset from the peripheral edge distance 120A. First contact portion 122A is configured to underlie second notch 66, when the first and second panes are assembled together with optically active material 18 positioned between the panes. As also shown in the example of FIG. 9B, second electrode layer 22 includes a second contact portion 122B extending from peripheral edge 62 of the second pane 16 to a remainder of the second electrode layer that is offset from the peripheral edge distance 120B. Second contact portion 122B is configured to underlie first notch 64, when the first and second panes are assembled together with optically active material 18 positioned between the panes.

In general, first contact portion 122A and second contact portion 122B can define any polygonal (e.g., square, rectangular, hexagonal) or arcuate (e.g., circular, elliptical) shape. The size of the contact portions may vary, e.g., depending on the size of the notches. In some examples, each contact portion may have a size greater than 10 square millimeters, such as greater than 25 square millimeters, greater than 50 square millimeters, or greater than 100 square millimeters. Additionally or alternatively, the size of each contact portion may be less than 1000 square millimeters, such as less than 750 square millimeters, or less than 500 square millimeters. For example, the size of each contact portion may range from may range from 5 square millimeters to 1000 square millimeters, such as from 100 square millimeters to 800 square millimeters, from 250 square millimeters to 600 square millimeters. The first contact portion 122A may be the same size and/or shape as the second contact portion 122B or may have a different size and/or shape.

Electrical connection configurations according to the disclosure can be used to provide electrical control over an electrically controllable optically active layer 18. While the foregoing description has generally described a privacy structure having one pair of notches (one on each pane), a structure according to the disclosure may have multiple pairs of notches. In different configurations, privacy structure 12 can be configured as a controllable monopixel structure or a multi-pixel structure. In a monopixel configuration, the entire active area over which optically active material 18 is positioned transitions from one visibility state to another visibility state. Accordingly, a single pair of notches may be sufficient to control the single pixel, although multiple pairs of notches with independent electrical connections can be provided for design redundancy. In a multi-pixel configuration, the active area over which optically active material 18 is positioned may be broken into different independently controllable regions, e.g., with the electrode layer being scribed or broken to separate different controllable regions. Each controllable region may have at least one pair of notches to provide independent electrical connection and control to each controllable region, or pixel, of the privacy structure.

Figure 10A:
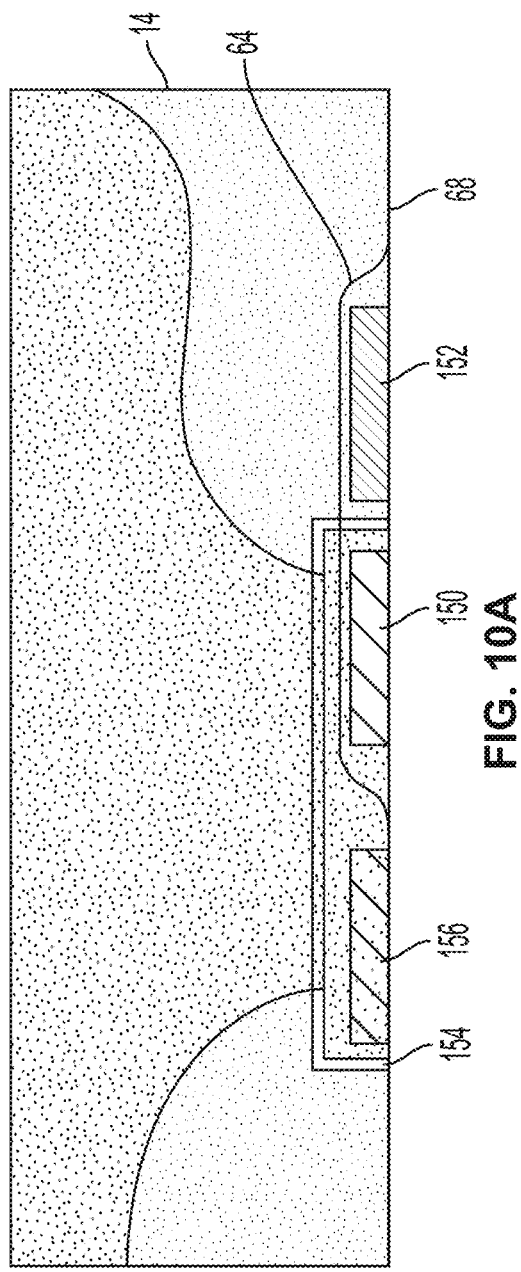
FIGS. 10A and 10B are top and side views, respectively, showing an example single notch electrical configuration according to the disclosure.
Figure 10B:
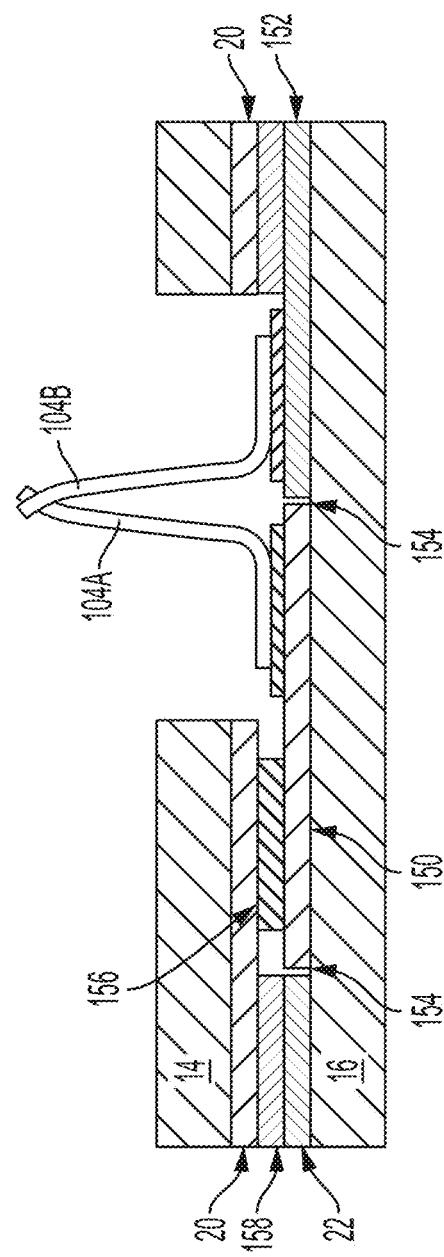

In still other examples, an electrical connection configuration according to the disclosure may be provided by a single notch rather than using multiple notches. In a single notch arrangement, two electrode pads or contact portions may be provided within the notch. The electrical contact portions within the single notch may be electrically isolated from each other and connected to different electrode layers. FIGS. 10A and 10B are top and side views, respectively, showing an example single notch electrical configuration.

As shown in the illustrated example, the first pane of transparent material 14 defines a peripheral edge 62 and a notch 64. Notch 64 provides access to an underlying second pane of transparent material 16 that does not include a second electrical connection notch associated with notch 64 in the first pane. First pane of transparent material 14 carries first electrode layer 20, while second pane of transparent material 16 carries second electrode layer 22. Two electrode layers or contact pads 150 and 152 are provided on second pane of transparent material 16 and accessible via notch 62. The two electrode layers or contact pads may be electrically isolated from each other, e.g., by scribing second electrode layer 22 to form one pad 150 that is electrically isolated from the remainder of the layer and a second pad 152 that is electrically coupled to the remainder of the layer. Accordingly, an electrically isolated perimeter 154 may be established around the contact pad 150 that is electrically isolated from the reminder of the electrode layer carried by second pane of transparent material 16. An insulating layer, such as an insulating adhesive 158 can be positioned between first electrode layer 20 and second electrode layer 22 in the region adjacent notch 64 to electrically isolate the two layers from each other.

To electrically connect first electrode layer 20 using notch 64, a connective crossover member 156 can be provided to electrically couple contact pad 150 to the electrode layer. The conductive crossover member 156 may be any electrically conductive structure, such as an electrically conductive layer (e.g., electrical pad), wire, conductive conduit, or other electrically conductive structure. Conductive crossover member 156 is electrically coupled to first electrode layer 20. In operation, electricity delivered to contact pad 150 is conveyed through conductive cross-over member 156 to first electrode layer 20. While conductive crossover 154 is illustrated as being a physically separate structure than contact pad 150 and first electrode layer 20, it should be appreciated that the conductive crossover may be an extension of or integrally formed with one or both structures.

To deliver electricity to first electrode layer 20 and second electrode layer 22 via single notch 64, wiring may extend from outside of the privacy structure and electrically connect to the first and second electrode layers in the notch. In the illustrated example, the wiring is illustrated as including a first wire 104A connected to the first electrode layer 20 and a second wire 104B connected to the second electrode layer 22. The wiring may be further connected to a power source, such as a driver that provides power and/or control signals to control optical active material 18.

Notches according to the disclosure have generally been illustrated as defining a cutout extending from an outer surface of a pane of transparent material to an inner surface of the pane, such as from outer surfaces 24B and 26B to inner surfaces 24A and 26A of the first and second panes of transparent material, respectively. A notch according to the disclosure may be formed from an edge of a pane of material inwardly toward a center of the pane of transparent material without extending through an entire thickness of the material.

Figure 11A:
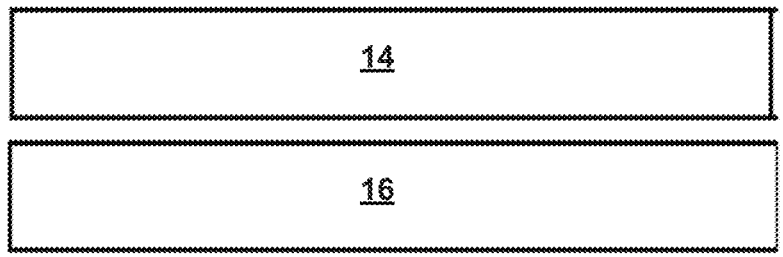
FIGS. 11A-11C illustrate example assembly steps for forming a notch in an edge of a pane of transparent material that does not extend through the entire thickness of the material.
Figure 11B:
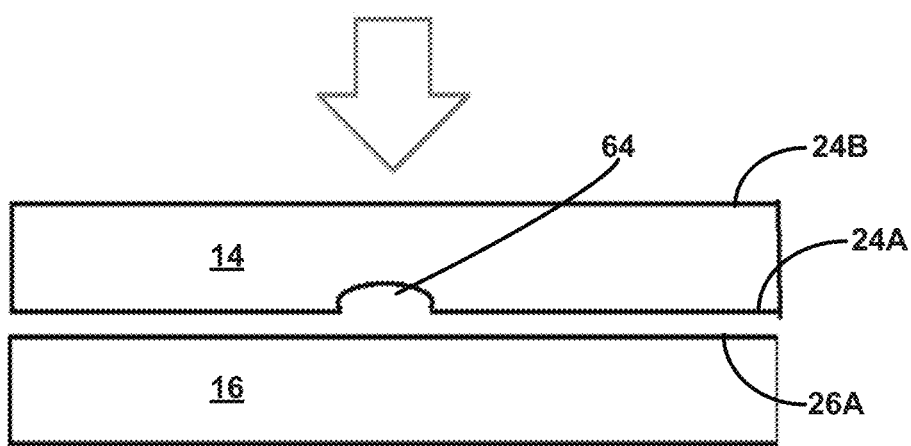
Figure 11C:
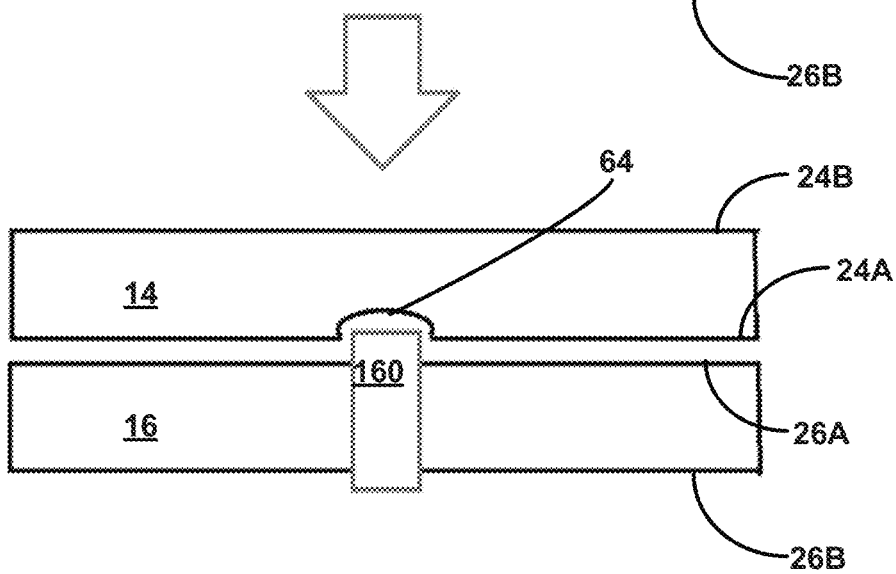

FIGS. 11A-11C illustrate example assembly steps for forming a notch in an edge of a pane of transparent material that does not extend through the entire thickness of the material. As shown in the illustrated example, a notch 64 is formed in a first pane of transparent material that does not extend through the entire thickness of the material. Rather, notch 64 cuts into the inner surface 24A of the first pane of transparent material without extending all the way through to the pane to the outer surface 24B. For example, notch 64 can extend from an outer facing edge of the pane of transparent material to a terminal wall inside of the pane of transparent material that bounds the notch.

As shown in FIG. 11C, an electrode 160 can be positioned in notch 64 from the side edge of the pane of transparent material rather than through the outer face of the pane of transparent material. Electrode 160 can provide electrical communication with an electrode layer on second pane of transparent material 16. Electrode 160 can extend out from the side edge of the pane of transparent material for connection to a power source.

Notch 64 in the example of FIGS. 11B and 11C can have a depth and dimensions as discussed above with respect to other notch configurations described herein. The thickness of notch 64 in embodiments where the notch does not extend through the entire thickness of the pane may be less than or equal to one half the thickness of the pane in which the notch is formed, such as a thickness ranging from $\frac{1}{10}$ to $\frac{1}{3}$ the thickness of the pane in which the notch is formed.

In some configurations, electrode 160 is configured to wrap around the second pane of transparent material in a generally U- or C-shaped configuration. When so configured, second pane of transparent material 16 may or may not include a relief notch in which a portion of the electrode wrapping about outer surface 26B of the pane is positioned.

Figure 12A:
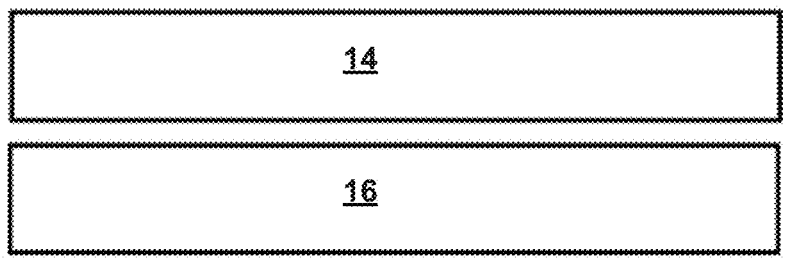
FIGS. 12A-12C illustrate example assembly steps for forming a notch and a relief notch in an edge of a pane of transparent material that does not extend through the entire thickness of the material.
Figure 12B:
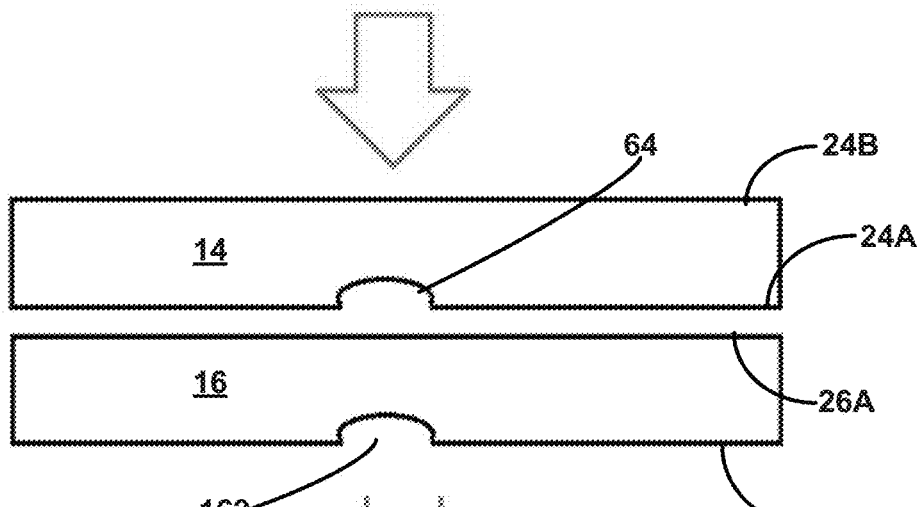
Figure 12C:
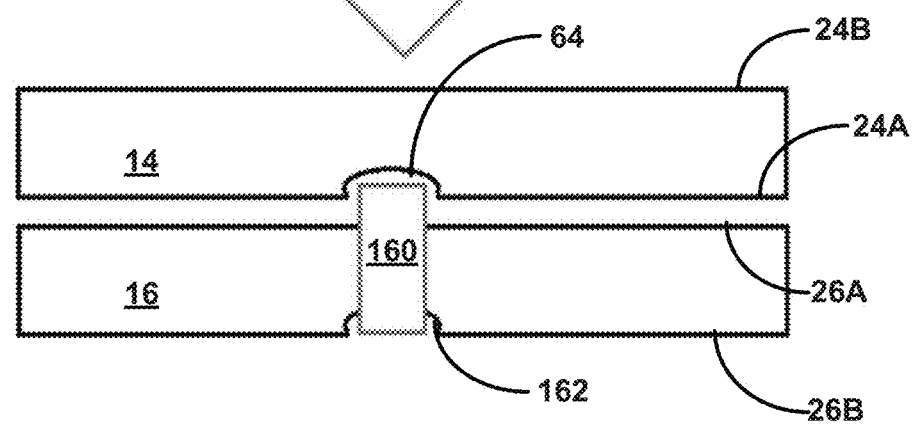

For example, FIGS. 12A-12C illustrate example assembly steps for forming a notch and a relief notch in an edge of a pane of transparent material that does not extend through the entire thickness of the material. The assembly steps illustrated in FIGS. 12A-12C are the same as those illustrated in FIGS. 11A-11C except that the second pane of transparent material 16 also includes a relief notch 162. As shown, relief notch 162 can be formed in the outer surface 26B extending toward the inner surface 26A of the second pane of transparent material 16. Relief notch 162 may have the same size and/or shape as notch 64 or may have a different size and/or shape. Relieve notch 162 can provide a cavity for receiving a portion of electrode 160 extending over and/or conforming to the side edge of the pane in which the notch is formed. In some examples, the edge itself is grooved in the region of electrode 160 relative to a remainder of the edge such that the top edge of the electrode is substantially flush (or even recessed) relative to the reminder of the edge.

Figure 13A:
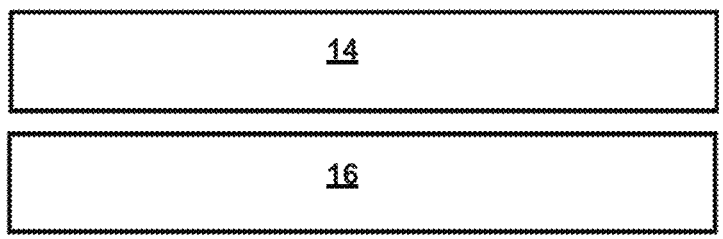
FIGS. 13A-13C illustrate example assembly steps for forming multiple notches in an edge of a pane of transparent material.
Figure 13B:
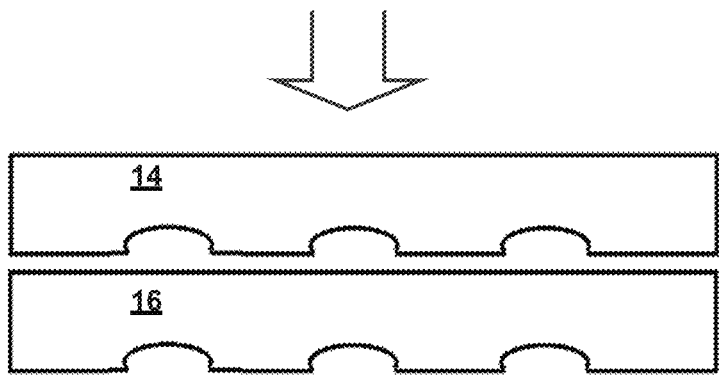
Figure 13C:
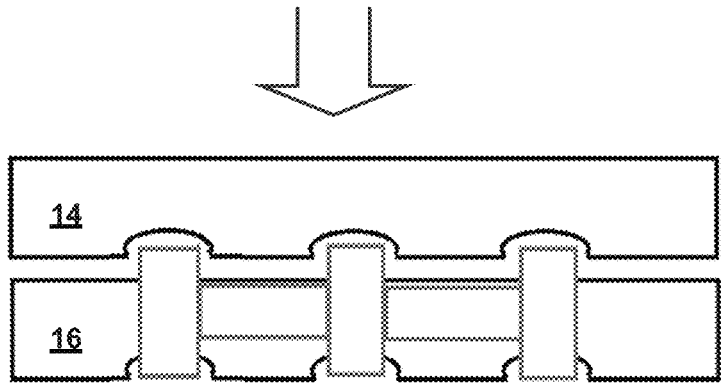

Although not illustrated in FIGS. 11A-11C and 12A-12C, first pane of transparent material 14 and second pane of transparent material 16 may a notch 64 and/or relief notch 162 on opposite surfaces from the surfaces in which the notches are illustrated as being formed. These opposite facing notch(es) can be used to electrically connected the electrode layer on the first pane of transparent material 14 with an electrode 160 similar to the configuration illustrated for electrically connecting the electrode layer on the second pane of transparent material. Additionally or alternatively, one or both electrode layers may be electrically addressed through multiple notches (e.g., two, three, or more notches) arranged in series with multiple electrically connected electrodes. An example of such a configuration is illustrated in FIGS. 13A-13C. Providing multiple electrical connection notches can be useful to provide redundant electrical connections in the event one electrical connection fails during the service life of the device.

Various examples have been described. These and other examples are within the scope of the following claims.

The invention claimed is:

1. A privacy glazing structure comprising:
a first pane of transparent material having an inner face and a peripheral edge;
a second pane of transparent material having an inner face and a peripheral edge;
a first electrode layer carried by the inner face of the first pane of transparent material, the first electrode layer including a first contact portion extending between the peripheral edge of the first pane of transparent material and a remainder of the first electrode layer but otherwise being offset from the peripheral edge of the first pane of transparent material about a perimeter of the first pane of transparent material;
a second electrode layer carried by the inner face of the second pane of transparent material, the second electrode layer including a second contact portion extending between the peripheral edge of the second pane of transparent material and a remainder of the second electrode layer but otherwise being offset from the peripheral edge of the second pane of transparent material about a perimeter of the second pane of transparent material;
an electrically controllable optically active material positioned between the first electrode layer and the second electrode layer;
a sealant extending around the perimeter of the first pane of transparent material and the second pane of transparent material and bonding the first pane of transparent material to the second pane of transparent material, the sealant being positioned in a region where the first electrode layer is offset from the peripheral edge of the first pane of transparent material and the second electrode layer is offset from the peripheral edge of the second pane of transparent material;
a first electrode engaged with the first contact portion of the first electrode layer; and
a second electrode engaged with the second contact portion of the second electrode layer.

2. The structure of claim 1, wherein:
the first electrode layer if offset from the perimeter about the first pane of transparent material by at least one of grinding and laser ablating the first electrode layer a distance from the peripheral edge of the first pane, and
the second electrode layer if offset from the perimeter about the second pane of transparent material by at least one of grinding and laser ablating the second electrode layer a distance from the peripheral edge of the second pane.

3. The structure of claim 1, wherein:
the first electrode layer is offset a distance ranging from 1 mm to 25 mm from the peripheral edge of the first pane, and
the second electrode layer is offset a distance ranging from 1 mm to 25 mm from the peripheral edge of the second pane.

4. The structure of claim 1, wherein:
the first electrode layer is offset a distance ranging from 5 mm to 15 mm from the peripheral edge of the first pane, and
the second electrode layer is offset a distance ranging from 5 mm to 15 mm from the peripheral edge of the second pane.

5. The structure of claim 1, wherein the first contact portion and second contact portion each define a polygonal shape.

6. The structure of claim 1, wherein the first contact portion and second contact portion each define a rectangular shape.

7. The structure of claim 1, wherein the first contact portion and second contact portion each have a size greater than 5 square millimeters.

8. The structure of claim 1, wherein the first contact portion and second contact portion each have a size ranging from 5 square millimeters to 1000 square millimeters.

9. The structure of claim 1, wherein the first pane and the second pane are each fabricated from float glass.

10. The structure of claim 1, wherein the first pane and the second pane each have a thickness ranging from 2 mm to 6 mm.

11. The structure of claim 1, wherein at least one of the first pane and the second pane is a laminated pane comprising two panes of glass bonded together with a polymer.

12. The structure of claim 11, wherein both of the first pane and the second pane are laminated glass panes.

13. The structure of claim 1, wherein the sealant comprises a polymeric material.

14. The structure of claim 1, further comprising a first wire, a second wire, and a driver, wherein the first electrode is electrically connected to the driver via the first wire, and the second electrode is electrically connected to the driver via the second wire.

15. The structure of claim 1, wherein the first pane defines a first notch providing access to the first contact portion of the first electrode layer, and the second pane defines a second notch providing access to the second contact portion of the second electrode layer.

16. The structure of claim 1, wherein the electrically controllable optically active material is a liquid crystal material having a light transmittance that varies in response to application of an electrical field.

17. The structure of claim 1, further comprising:
a third pane of transparent material generally parallel to the first pane of transparent material and the second pane of transparent material, and
a spacer positioned between the third pane of transparent material and the first pane of transparent material to define a between-pane space, the spacer sealing the between-pane space from gas exchange with a surrounding environment and holding the first pane of transparent material a separation distance from the third pane of transparent material.

18. The structure of claim 17, wherein the between-pane space is filled with an insulative gas.

19. The structure of claim 1, further comprising a frame surrounding the structure.

20. The structure of claim 19, wherein the frame configures the structure as a window.

* * * * *